(12) United States Patent
Ge et al.

(10) Patent No.: US 12,519,653 B2
(45) Date of Patent: Jan. 6, 2026

(54) RESOURCE ALLOCATION METHOD AND APPARATUS, AND STORAGE MEDIUM

(71) Applicant: HUAWEI TECHNOLOGIES CO., LTD., Guangdong (CN)

(72) Inventors: Zhiguo Ge, Shenzhen (CN); Chenyu Wang, Singapore (SG); Yongzheng Wu, Singapore (SG); Tao Huang, Singapore (SG)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 320 days.

(21) Appl. No.: 18/192,834

(22) Filed: Mar. 30, 2023

(65) Prior Publication Data
US 2023/0239159 A1 Jul. 27, 2023

Related U.S. Application Data

(63) Continuation of application No. PCT/CN2020/119755, filed on Sep. 30, 2020.

(51) Int. Cl.
*H04L 9/32* (2006.01)
*G06F 9/50* (2006.01)

(52) U.S. Cl.
CPC .......... *H04L 9/3242* (2013.01); *G06F 9/5016* (2013.01)

(58) Field of Classification Search
CPC ....... H04L 9/3242; G06F 9/5016; G06F 21/64
See application file for complete search history.

(56) References Cited

U.S. PATENT DOCUMENTS 9,076,019 B2 7/2015 Gueron et al.
9,710,675 B2 7/2017 Durham et al.
(Continued)

FOREIGN PATENT DOCUMENTS

CN 102629236 A 8/2012
CN 105022968 A 11/2015
(Continued)

OTHER PUBLICATIONS

Saileshwar Gururaj et al: "Morphable Counters: Enabling Compact Integrity Trees for Low-Overhead Secure Memories", 2018 51st Annual IEEE/ACM International Symposium on Microarchitecture (Micro), IEEE, Oct. 20, 2018 (Oct. 20, 2018), 12 pages total, XP033473314.
(Continued)

*Primary Examiner* — Abiy Getachew
(74) *Attorney, Agent, or Firm* — WOMBLE BOND DICKINSON (US) LLP

(57) ABSTRACT

The method includes: obtaining, in response to a write request for a target data block, a value of a first sub-counter corresponding to the target data block in an integrity tree, where the first sub-counter is a sub-counter of a first shared counter, and a first storage resource of the first sub-counter belongs to a storage resource of the first shared counter; and allocating a second storage resource to the first sub-counter when it is detected that a value obtained after a first value is added to the value of the first sub-counter is greater than a maximum storage value of the first storage resource. In this way, the adjusted storage resource of the first sub-counter is increased, thereby further preventing overflow of the first sub-counter and improving performance of data integrity verification of the integrity tree.

20 Claims, 13 Drawing Sheets

(56) References Cited

U.S. PATENT DOCUMENTS

| | | | |
|---|---|---|---|
| 9,798,900 | B2 | 10/2017 | Oh et al. |
| 10,185,842 | B2 | 1/2019 | Chhabra et al. |
| 10,230,528 | B2 | 3/2019 | Bhattacharyya et al. |
| 10,243,990 | B1 | 3/2019 | Chen et al. |
| 10,303,612 | B2 | 5/2019 | Chhabra |
| 2009/0119673 | A1* | 5/2009 | Bubba .............. G06F 9/50 713/300 |
| 2014/0040632 | A1 | 2/2014 | Chhabra et al. |
| 2014/0101461 | A1 | 4/2014 | Chhabra et al. |
| 2014/0208109 | A1* | 7/2014 | Narendra Trivedi ... G06F 21/78 713/170 |
| 2014/0223197 | A1* | 8/2014 | Gueron .............. H04L 9/3242 713/193 |
| 2015/0370726 | A1* | 12/2015 | Hashimoto ......... G06F 12/1416 711/163 |
| 2016/0283405 | A1 | 9/2016 | Oh et al. |
| 2017/0177505 | A1 | 6/2017 | Basak et al. |
| 2019/0043600 | A1 | 2/2019 | Saileshwar et al. |
| 2019/0044729 | A1 | 2/2019 | Chhabra et al. |
| 2019/0229924 | A1* | 7/2019 | Chhabra .............. H04L 9/3242 |
| 2019/0251275 | A1* | 8/2019 | Ramrakhyani ..... G06F 21/6218 |

FOREIGN PATENT DOCUMENTS

| | | |
|---|---|---|
| CN | 105069379 A | 11/2015 |
| CN | 105138478 B | 10/2018 |
| WO | 2019025762 A1 | 2/2019 |

OTHER PUBLICATIONS

Jakub Szefer, Sebastian Biedermann, Towards fast hardware memory integrity checking with skewed Merkle trees, HASP 4: Proceedings of the Third Workshop on Hardware and Architectural Support for Security and Privacy, Jun. 15, 2014, total 8 pages.

Brian Rogers et al: Using Address Independent Seed Encryption and Bonsai Merkle Trees to Make Secure Processors OS- and Performance-Friendly, 40th IEEE/ACM International Symposium on Microarchitecture, Dec. 26, 2007, total 12 pages.

Meysam Taassori et al: VAULT: Reducing Paging Overheads in SGX with Efficient Integrity Verification Structures, ASPLOS 18: Proceedings of the Twenty-Third International Conference on Architectural Support for Programming Languages and Operating Systems, Mar. 19, 2018, total 14 pages.

Gururaj Saileshwar et al:Morphable Counters: Enabling Compact Integrity Trees For Low-Overhead Secure Memories, 2018 51st Annual IEEE/ACM International Symposium on Microarchitecture (MICRO), Dec. 13, 2018, total 12 pages.

Intel, Software Guard Extensions tutorial part 1 foundation, 2015, total 3 pages.

* cited by examiner

RESOURCE ALLOCATION METHOD AND APPARATUS, AND STORAGE MEDIUM

CROSS-REFERENCE TO RELATED APPLICATIONS

This application is a continuation of International Application No. PCT/CN2020/119755, filed on Sep. 30, 2020, the disclosure of which is hereby incorporated by reference in its entirety.

TECHNICAL FIELD

This application relates to the field of computer security technologies, and in particular, to a resource allocation method and apparatus, and a storage medium.

BACKGROUND

Data integrity is one of three basic key points of information security, to ensure that in processes of transmitting, storing, and processing information or data, the information or data is not tampered with without authorization or can be quickly detected after being tampered with.

To avoid data tampering, a concept of an integrity tree is proposed in a software guard extensions (SGX) architecture of Intel. The integrity tree is used to protect integrity of data in a memory and protect the data in the memory from a replay attack. Counters of a leaf layer of the integrity tree are used to protect data in a dynamic random access memory (DRAM), and counters of a middle layer of the integrity tree are used to protect data in a next layer. Each time data is written into the DRAM, a value of a corresponding counter is changed. In a subsequent data reading process, integrity of read data is verified based on the value of the counter.

In a data integrity verification process, it is found that performance of data integrity verification is poor because the counter in the current integrity tree easily overflows.

SUMMARY

Embodiments of this application provide a resource allocation method and apparatus, and a storage medium, to prevent frequent overflow of a counter in an integrity tree, thereby improving performance of data integrity verification of the integrity tree.

According to a first aspect, an embodiment of this application provides a resource allocation method, including: obtaining, in response to a write request for a target data block, a value of a first sub-counter corresponding to the target data block in an integrity tree, where the first sub-counter is a sub-counter of a first shared counter, a first storage resource of the first sub-counter belongs to a storage resource of the first shared counter, and the first shared counter is a shared counter of a leaf node corresponding to the target data block in the integrity tree; and allocating a second storage resource to the first sub-counter when it is detected that a value obtained after a first value is added to the value of the first sub-counter is greater than a maximum storage value of the first storage resource, where the second storage resource belongs to the storage resource of the first shared counter, and the first value is a positive integer.

In embodiments of this application, the first sub-counter is a sub-counter of the first shared counter, and the first storage resource of the first sub-counter belongs to the storage resource of the first shared counter. When detecting that the value obtained after the first value is added to the value of the first sub-counter is greater than the maximum storage value of the first storage resource, a processor allocates the second storage resource in the storage resource of the first shared counter to the first sub-counter, so as to implement dynamic adjustment of the storage resource of the first shared counter, thereby improving utilization of the storage resource of the first shared counter. In this way, the adjusted storage resource of the first sub-counter is increased, thereby further preventing overflow of the first sub-counter and improving performance of data integrity verification of the integrity tree.

In an embodiment, the first value is 1.

In some embodiments, the first shared counter further includes a second sub-counter, a third storage resource of the second sub-counter belongs to the storage resource of the first shared counter, and the second storage resource includes an idle storage resource that is not used in the third storage resource.

In some embodiments, the first shared counter further includes a resource partitioning identifier, and the resource partitioning identifier indicates a storage resource of the first sub-counter.

In some embodiments, the obtaining, in response to a write request for a target data block, a value of a first sub-counter corresponding to the target data block in an integrity tree includes: obtaining the first shared counter in response to the write request for the target data block; obtaining a first resource partitioning identifier from the first shared counter; obtaining the first storage resource based on the first resource partitioning identifier and a preset correspondence between a resource partitioning identifier and a storage resource; and parsing out the value of the first sub-counter from the first shared counter based on the first storage resource, to implement accurate parsing for the value of the first sub-counter.

In some embodiments, the allocating a second storage resource to the first sub-counter includes: obtaining, based on the first storage resource and the preset correspondence between a resource partitioning identifier and a storage resource, a storage resource corresponding to a second resource partitioning identifier, where the storage resource corresponding to the second resource partitioning identifier is greater than the first storage resource; determining a size of the second storage resource based on a size of the storage resource corresponding to the second resource partitioning identifier and a size of the first storage resource; and obtaining, based on the size of the second storage resource, the second storage resource from the idle storage resource that is not used in the third storage resource, and allocating the obtained second storage resource to the first sub-counter, so as to increase the storage resource of the first counter.

In some embodiments, the processor needs to add the first value to the value of the first sub-counter when the second storage resource is allocated to the first sub-counter; and determine a message authentication code MAC value of the target data block based on the value of the first sub-counter after addition.

In an example, the allocating a second storage resource to the first sub-counter includes:

when it is detected that there is an unused idle storage resource in the third storage resource, allocating the second storage resource in the unused idle storage resource to the first sub-counter.

In embodiments of this application, when it is detected that there is no unused idle storage resource in the third storage resource, a second value is added to a value of an overflow counter of a first node in which the first shared counter is located, and values of both the first sub-counter and the second sub-counter are set to a third value, where the second value is a positive integer, and the third value is a positive number.

In an embodiment, the second value is 1, and the third value is 0.

In this case, the method in embodiments of this application further includes: setting values of all counters other than the overflow counter in the first node to the third value when the values of the first counter and the second sub-counter are set to the third value.

In some embodiments, a distance between storage addresses, in a storage device, of data blocks corresponding to two adjacent sub-counters in the first shared counter is a default value.

According to a second aspect, an embodiment of this application provides a resource allocation apparatus. The apparatus includes a processor.

The processor is configured to: obtain, in response to a write request for a target data block, a value of a first sub-counter corresponding to the target data block in an integrity tree, where the first sub-counter is a sub-counter of a first shared counter, a first storage resource of the first sub-counter belongs to a storage resource of the first shared counter, and the first shared counter is a shared counter of a leaf node corresponding to the target data block in the integrity tree; and allocate a second storage resource to the first sub-counter when it is detected that a value obtained after a first value is added to the value of the first sub-counter is greater than a maximum storage value of the first storage resource, where the second storage resource belongs to the storage resource of the first shared counter, and the first value is a positive integer.

In some embodiments, the first shared counter further includes a second sub-counter, a third storage resource of the second sub-counter belongs to the storage resource of the first shared counter, and the second storage resource includes an idle storage resource that is not used in the third storage resource.

In some embodiments, the first shared counter further includes a resource partitioning identifier, and the resource partitioning identifier indicates a storage resource of the first sub-counter.

In some embodiments, the processor is configured to: obtain the first shared counter in response to the write request for the target data block; obtain a first resource partitioning identifier from the first shared counter; obtain the first storage resource based on the first resource partitioning identifier and a preset correspondence between a resource partitioning identifier and a storage resource; and parse out the value of the first sub-counter from the first shared counter based on the first storage resource.

In some embodiments, the processor is configured to: obtain, based on the first storage resource and the preset correspondence between a resource partitioning identifier and a storage resource, a storage resource corresponding to a second resource partitioning identifier, where the storage resource corresponding to the second resource partitioning identifier is greater than the first storage resource; determine a size of the second storage resource based on a size of the storage resource corresponding to the second resource partitioning identifier and a size of the first storage resource; and obtain, based on the size of the second storage resource, the second storage resource from the idle storage resource that is not used in the third storage resource, and allocate the obtained second storage resource to the first sub-counter.

In some embodiments, the processor is further configured to: add the first value to the value of the first sub-counter when the second storage resource is allocated to the first sub-counter; and determine a message authentication code MAC value of the target data block based on the value of the first sub-counter after addition.

In some embodiments, the processor is further configured to: when it is detected that there is an unused idle storage resource in the storage resource of the second sub-counter, allocate the second storage resource in the unused idle storage resource to the first sub-counter.

In some embodiments, the processor is further configured to: when it is detected that there is no unused idle storage resource in the storage resource of the second sub-counter and there is no idle storage resource that is not allocated in the first shared counter, add a second value to a value of an overflow counter of a first node in which the first shared counter is located, and set values of both the first sub-counter and the second sub-counter to a third value, where the second value is a positive integer, and the third value is a positive number.

In some embodiments, the apparatus further includes:
setting values of all counters other than the overflow counter in the first node to the third value when the values of the first counter and the second sub-counter are set to the third value.

In some embodiments, a distance between storage addresses, in a storage device, of data blocks corresponding to two adjacent sub-counters in the first shared counter is a default value.

For beneficial effects of the resource allocation apparatus provided in the second aspect and the possible implementations of the second aspect, refer to beneficial effects brought by the first aspect and the possible implementations of the first aspect. Details are not described herein again.

According to a third aspect, an embodiment of this application provides a computer storage medium. The storage medium includes a computer instruction, and when the instruction is executed by a computer, the computer is enabled to implement the resource allocation method according to any one of the first aspect.

According to a fourth aspect, an embodiment of this application provides a computer program product. The program product includes a computer program, and the computer program is stored in a readable storage medium. At least one processor of a communication device may read the computer program from the readable storage medium, and the at least one processor executes the computer program to enable the communication device to implement the resource allocation method according to any one of the first aspect.

According to the resource allocation apparatus and apparatus, and the storage medium provided in embodiments of this application, in response to a write request for a target data block, a value of a first sub-counter corresponding to the target data block in an integrity tree is obtained, where the first sub-counter is a sub-counter of a first shared counter, and a first storage resource of the first sub-counter belongs to a storage resource of the first shared counter. A second storage resource is allocated to the first sub-counter when it is detected that a value obtained after a first value is added to the value of the first sub-counter is greater than a maximum storage value of the first storage resource, so as to implement dynamic adjustment of the storage resource of the first shared counter, thereby improving utilization of the storage resource of the first shared counter. In this way, the adjusted storage resource of the first sub-counter is increased, thereby further preventing overflow of the first sub-counter and improving performance of data integrity verification of the integrity tree.

DESCRIPTION OF EMBODIMENTS

The following describes technical solutions in embodiments of this application with reference to the accompanying drawings in embodiments of this application.

It should be understood that in embodiments of this application, "B corresponding to A" indicates that B is associated with A. In an embodiment, B may be determined based on A. However, it should further be understood that determining B based on A does not mean determining B only based on A, and B may further be determined based on A and/or other information. The term "a plurality of" in this specification means two or more than two. The term "and/or" in this specification describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects. In the formula, the character "/" indicates a "division" relationship between the associated objects.

In this specification, claims, and accompanying drawings of the present disclosure, the terms such as "first" and "second" distinguish between same items or similar items whose functions and effects are basically the same. One of ordinary skilled in the art may understand that the terms such as "first" and "second" do not limit a quantity or an execution sequence, and the terms such as "first" and "second" do not indicate a definite difference.

Figure 1:
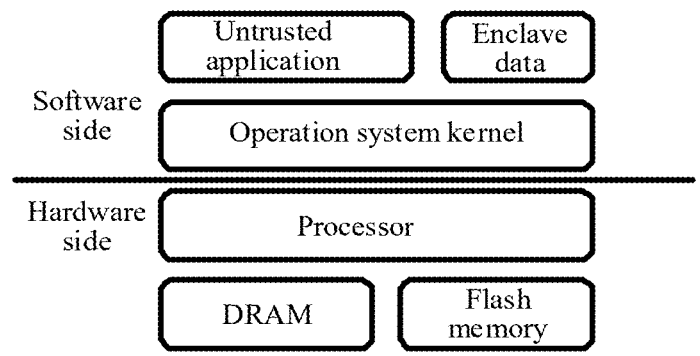
FIG. 1 is a schematic diagram of a structure of a computer system stack according to an embodiment of this application.

FIG. 1 is a schematic diagram of a structure of a computer system stack according to an embodiment of this application. As shown in FIG. 1, the computer system stack includes a software side and a hardware side. The software side includes an untrusted application (Untrusted App), enclave data (Enclave), and an operating system kernel (OS Kernel). The hardware side includes a processor, a DRAM, and a flash memory.

Based on big data and cloud computing, information processing is centralized and efficient. A cloud provider provides a large computing capability for a cloud tenant, to release the cloud tenant from hardware and work such as network maintenance and capacity expansion. However, this also brings about security problems: All data of the cloud tenant is fully open to the cloud provider. A malicious cloud provider or cloud provider employee can easily steal and tamper with data of the cloud tenant. As a result, the cloud tenant does not dare to migrate confidential data to the cloud, which restricts the development of cloud computing.

In an SGX architecture, the cloud tenant trusts only a processor (such as an Intel CPU) instead of the cloud provider. Applications of the cloud tenant are run in an isolated running mode (referred to as an Enclave). The cloud provider cannot read or tamper with enclave data from software or hardware. In FIG. 1, the untrusted application, the operating system kernel, the DRAM, and the flash memory are untrustworthy, and the Enclave and the processor are trustworthy. For software, cloud provider software (including an operating system, a driver, and a software library) is isolated from the enclave and cannot read or write the enclave data. For hardware, the enclave data is encrypted and stored in both a memory and a hard disk, and is decrypted only in the processor. Due to complexity and high density of processor circuits, it is generally difficult for the cloud provider to physically open the processor to obtain data.

Through encryption, data can be prevented from being stolen, but cannot prevent data from being tampered with. To prevent tampering, the processor needs to verify data integrity. The technical solutions provided in embodiments of this application are used for data integrity verification.

For ease of understanding embodiments of this application, related concepts in embodiments of this application are first briefly described below.

Data integrity is one of three basic key points of information security, to ensure that in processes of transmitting, storing, and processing information or data, the information or data is not tampered with without authorization or can be quickly detected after being tampered with.

In a replay attack, an attacker records data and a MAC value at a time point T1 and replays, at a time point T2, the data and the MAC value recorded at the time point T1, to change the data at the time point T2 to the data at the time point T1.

A branching factor (Fanout), also referred to as fan-out, describes a quantity of sub-nodes of a node in a tree structure.

A cache is a storage unit faster than the memory. The present patent relates to two types of caches: a data cache (L1, L2, L3) and an integrity tree node cache.

Cache line Read and write operations performed by the CPU for the memory is in the unit of one cache line. A size is usually 64 Bytes.

Nonce is short for Number used once, and is a number that can be used only once in encrypted communication to prevent a replay attack.

Counter: To prevent the replay attack, a counter is introduced. A value of the counter is increased by 1 each time a write operation is performed on the memory, to ensure that the data written each time is different. In this application, a counter in a Merkle Tree is used as a Nonce.

A data block is a basic data unit for memory integrity protection.

An integrity tree is a data structure used to protect memory integrity. The integrity tree is a tree structure and formed by a plurality of integrity tree nodes. A feature of the integrity tree is that integrity of local data can be quickly verified. The integrity tree is widely used in scenarios such as bitcoin and system partitions of an Android mobile phone. The Merkle Tree is a typical integrity tree.

The integrity tree has a plurality of variants. The following describes a common integrity tree.

Figure 2:
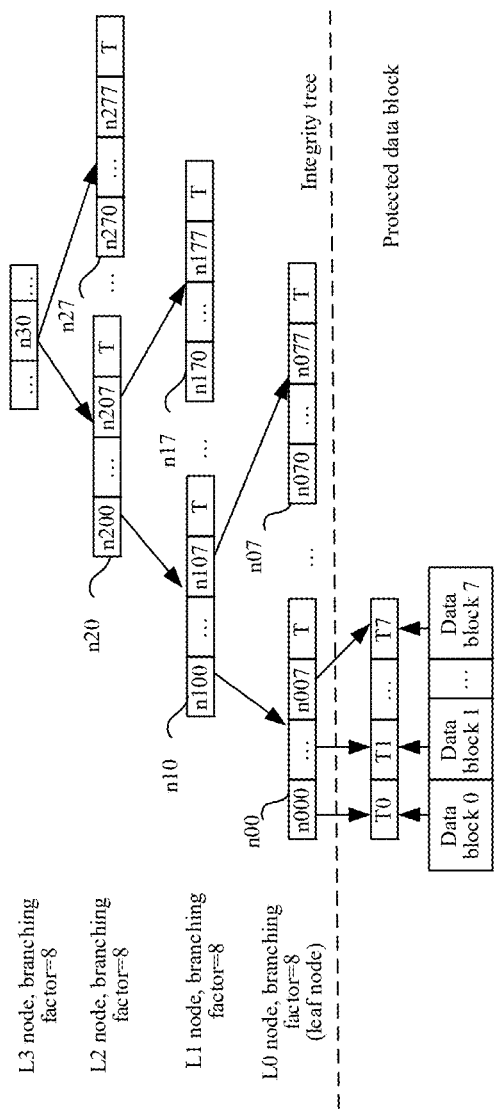
FIG. 2 is a schematic diagram of a structure of an integrity tree according to an embodiment of this application.

FIG. 2 is a schematic diagram of a structure of an integrity tree according to an embodiment of this application. As shown in FIG. 2, the integrity tree includes four layers, and layers are associated with each other through dependency. A branching factor is 8. In other words, each node includes eight sub-nodes. It should be noted that FIG. 2 is merely an example. A quantity of layers of the integrity tree is not limited to four layers in FIG. 2, and may be more than four or less than four. The branching factor is not limited to 8, for example, may be more than 8 or less than 8. As shown in FIG. 2, n30 is one of eight root nodes; and n20, n21, . . . , and n27 are eight sub-nodes of the root node n30, and are located at a layer 2. Each node in n20, n21, . . . , and n27 includes eight counters. For example, eight counters included in the node n20 are n200 to n207, and eight counters included in the node n27 are n270 to n277. Herein, n10, n11, . . . , and n17 are eight sub-nodes of the node n20, and are located at a layer 1. Each node in n10, n11, . . . , and n17 includes eight counters. For example, eight counters included in the node n10 are n100 to n107, and eight counters included in the node n17 are n170 to n177. Herein, n00, n01, . . . , and n07 are eight sub-nodes of the node n10, are also referred to as leaf nodes, and are located at a layer 0. Each node in n00, n01, . . . , and n07 includes eight counters. For example, eight counters included in the node n00 are n000 to n007, and eight counters included in the node n07 are n070 to n077. A storage region of a memory is partitioned into a plurality of data blocks. Each counter in a leaf node corresponds to one data block. For example, a counter n000 in the leaf node n00 corresponds to a data block 0 and is configured to maintain integrity of data in the data block 0. A counter n001 in the leaf node n00 corresponds to a data block 1 and is configured to maintain integrity of data in the data block 1. A counter n007 in the leaf node n00 corresponds to a data block 7 and is configured to maintain integrity of data in the data block 7.

Figure 3:
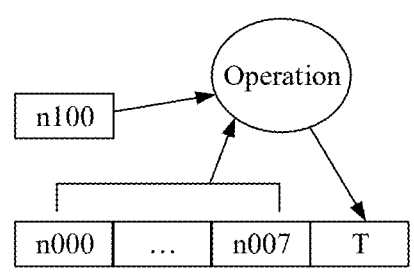
FIG. 3 is a schematic diagram of determining a tag according to an embodiment of this application.
Figure 4:
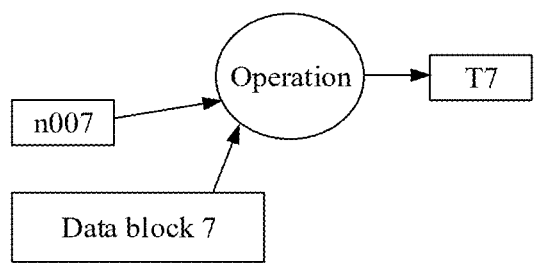
FIG. 4 is another schematic diagram of determining a tag according to an embodiment of this application.

It can be learned from FIG. 2 that each sub-node includes eight counters and one tag (Tag, T for short). The tag may be understood as a Nonce. FIG. 3 and FIG. 4 show a process of determining a value of a tag. For example, it can be learned from FIG. 2 that a node corresponds to a counter in a parent node of the node. In this way, a tag of the node may be determined according to a preset operation rule based on a value of the corresponding counter in the parent node of the node and a value of each counter in the node. For example, as shown in FIG. 2, the node n00 corresponds to a counter n100 in the parent node n10. In this way, as shown in FIG. 3, a value of a tag T of the node n00 may be obtained according to the preset operation rule based on a value of the counter n100 and values of counters n000 to n007 in the node n10. As shown in FIG. 2, each data block also corresponds to a tag T. A process of determining a value of a tag of a data block is similar to a process of determining a value of a tag of a node. For example, one data block corresponds to one counter in a leaf node. For example, in FIG. 2, the data block 7 corresponds to the counter n007 in the leaf node n00. In this way, a value of a tag of a data block may be determined according to a preset operation rule based on a value of the counter corresponding to the data block and data in the data block. For example, as shown in FIG. 4, the value of the tag T7 corresponding to the data block 7 is obtained according to the preset operation rule based on the data stored in the data block 7 and the value of the counter n007 corresponding to the data block 7.

In an embodiment, the operation rule used for determining a tag may be a hash operation, or may be a MAC operation, that is, a value of the tag may be a MAC value.

Figure 5A:
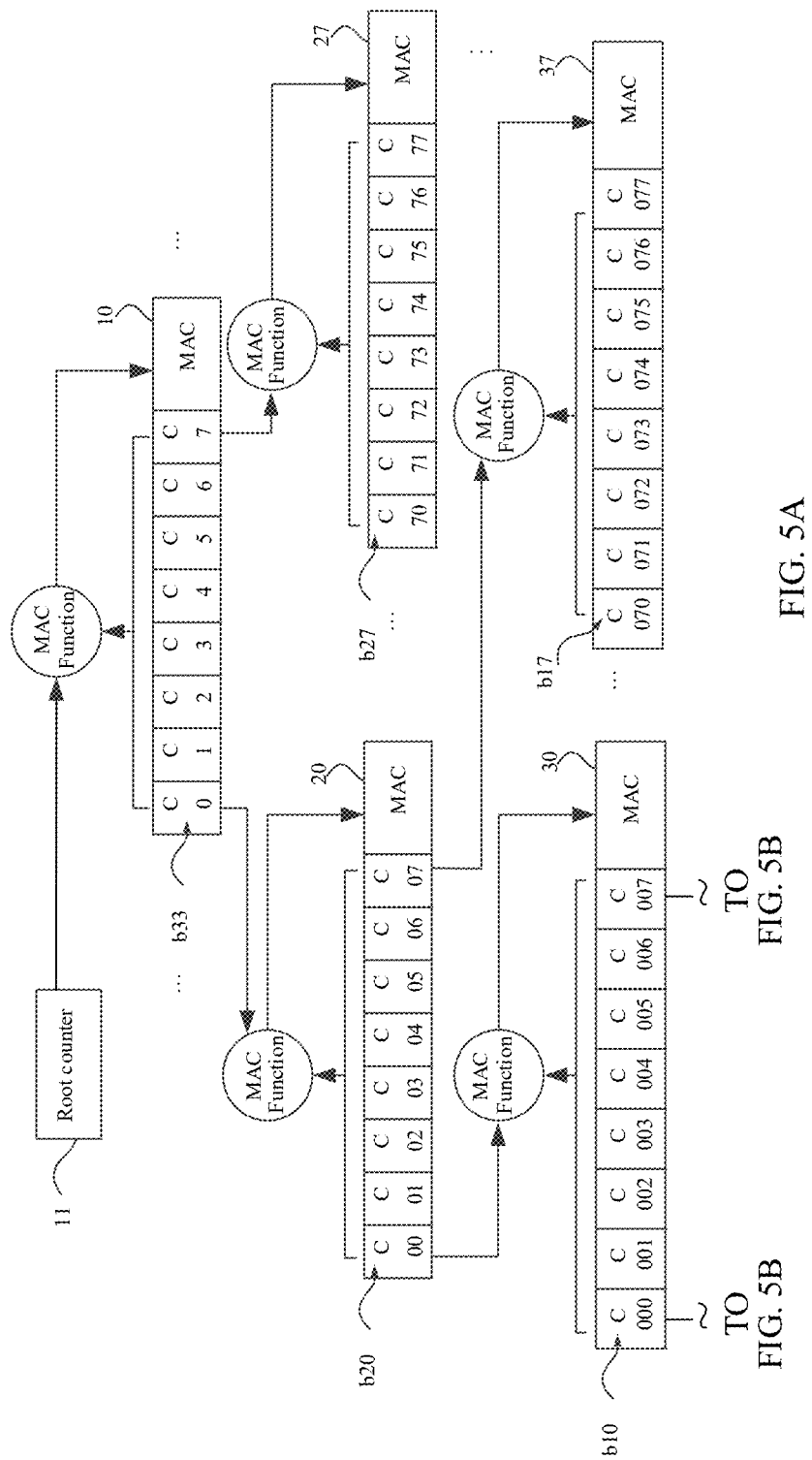
FIG. 5A and FIG. 5B are another schematic diagram of a data structure of a counter integrity tree according to an embodiment of this application.
Figure 5B:
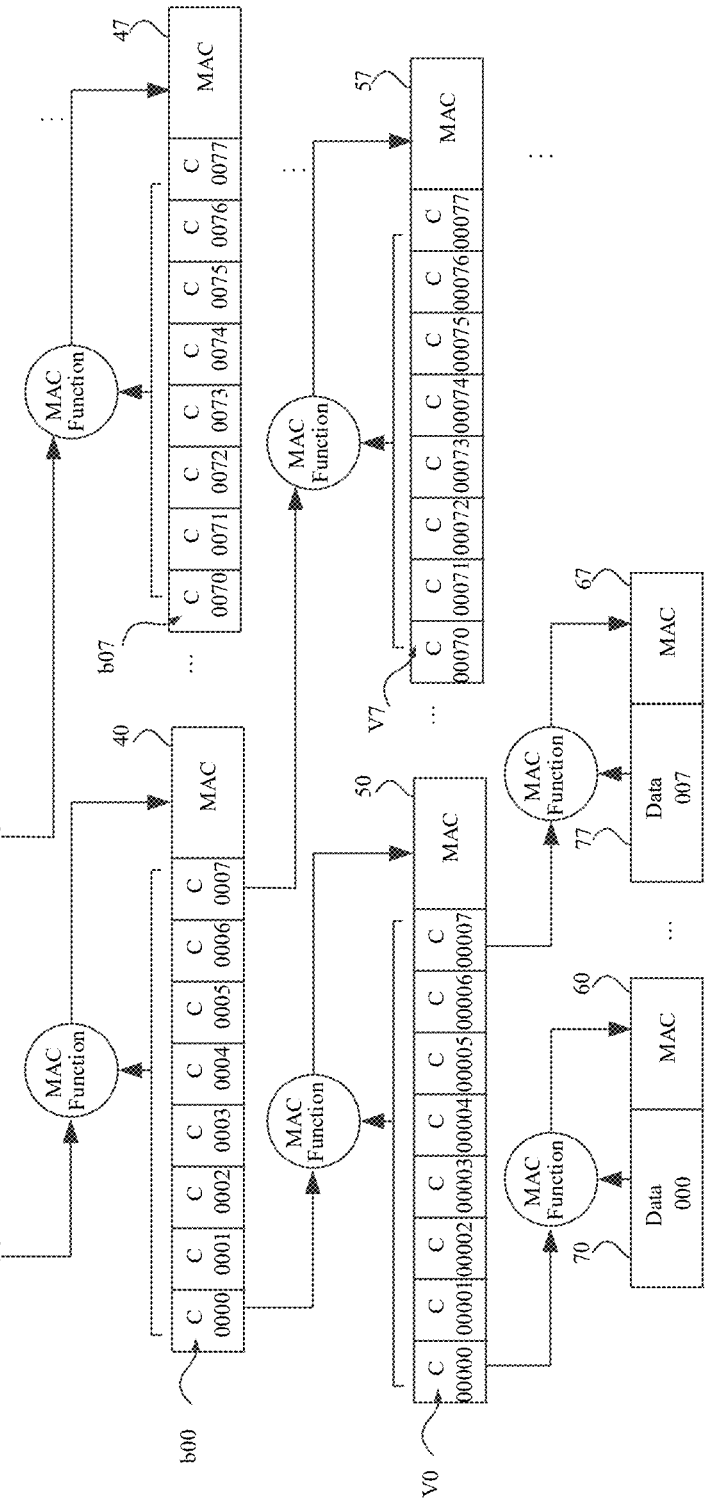

FIG. 5A and FIG. 5B are another schematic diagram of a data structure of a counter integrity tree according to an embodiment of this application. As shown in FIG. 5A and FIG. 5B, the integrity tree includes five layers. It is assumed that a tag of each node is a message authentication code (MAC). A root node b33 is used as an example. A root counter corresponding to the root node b33 is a root counter 11, the root node b33 includes eight counters and a MAC 10, and the eight counters are respectively denoted as C0 to C7. The MAC 10 is obtained through calculation by using a MAC function based on the root counter 11 and values of eight counters C0 to C7 of the root node b33. The eight counters of the root node b33 are respectively in one-to-one correspondence with eight sub-nodes b20 to b27 of the root node b33. For example, the node b20 corresponds to the counter C0 of the root node b33, the node b21 corresponds to the counter C1 of the root node b33, and so on. The node b27 corresponds to the counter C7 of the root node b33. Each of the sub-nodes b20 to b27 includes eight counters and one MAC. For example, the sub-node b20 includes eight counters C00 to C07 and a MAC 20. The MAC 20 is obtained through calculation by using the MAC function based on the counter C0 of the root node b33 and the eight counters C00 to C07 of the sub-node b20. For example, a MAC 27 of the sub-node b27 is obtained through calculation by using the MAC function based on the counter C7 of the root node b33 and eight counters C70 to C77 of the sub-node b27. By analogy, a MAC 30 of a sub-node b10 is obtained through calculation by using the MAC function based on the counter C00 of the node b20 and eight counters C000 to C007 of the node b10, a MAC 37 of a sub-node b17 is obtained through calculation by using the MAC function based on the counter C07 of the node b20 and eight counters C070 to C077 of the node b17, a MAC 40 of a sub-node b00 is obtained through calculation by using the MAC function based on the counter C000 of the node b10 and eight counters C0000 to C0007 of the node b00, and a MAC 47 of a sub-node b07 is obtained through calculation by using the MAC function based on the counter C007 of the node b10 and eight counters C0070 to C0077 of the node b07.

By analogy, for eight leaf nodes v0 to v7 of the sub-node b00, each leaf node includes eight counters and one MAC. A leaf node v0 is used as an example. The leaf node v0 includes eight counters C00000 to C00007 and a MAC 50. The MAC 50 is obtained through calculation by using the MAC function based on the counter C0000 of the sub-node b00 and the eight counters C00000 to C00007 of the leaf node v0. The eight counters of the leaf node v0 respectively correspond to eight data blocks in the memory, and each data block corresponds to one MAC. For example, a MAC 60 of a data block 70 is obtained through calculation by using the MAC function based on the counter C00000 and data 000 in the data block 70, and a MAC 67 of a data block 77 is obtained through calculation by using the MAC function based on the counter C00007 and data 007 in the data block 77. It should be noted that the tag T and the MAC each may be understood as a Nonce.

It may be learned from FIG. 5A and FIG. 5B that a MAC used to verify integrity of data in a data block is maintained by a leaf node corresponding to the data block, and a MAC used to verify integrity of a leaf node is maintained by a parent node of the leaf node. Integrity of the parent node may be maintained by using another parent node in the tree. The rest is deduced by analogy, until the root node is verified.

In a write process of data, as shown in FIG. 5A and FIG. 5B, each time data is written into a data block, a value of a corresponding counter in the integrity tree is incremented or updated. For example, when data is written into the data block 70, and the data in the data block 70 is updated, a value of the counter C00000 in the leaf node v0 corresponding to the data block 70 is incremented, for example, increased by 1. Incrementing the value of the counter C00000 in the leaf node v0 triggers recalculation of the MAC of the leaf node v0.

In a read process of data, as shown in FIG. 5A and FIG. 5B, for example, data 000 in the data block 70 is read. To verify integrity of the data 000 in the data block 70, the MAC 60 of the data block 70 is verified. For example, the counter C00000 in the leaf node v0 is read, a value 1 is obtained through calculation by using the MAC function based on a value of the counter C00000 and the data 000, and the value 1 obtained through calculation is matched with a value 2 of the MAC 60 stored in the data block 70. If the stored value 2 does not match the value 1 obtained through calculation, it indicates that the data 000 is tampered with. If the stored value 2 matches the calculated value 1, integrity of the leaf node v0 continues to be verified. For example, a parent node (that is, the node b00) of the leaf node v0 is read, and a calculated MAC of the leaf node v0 is obtained through calculation by using the MAC function based on a value of a counter (that is, the counter C0000) corresponding to the leaf node v0 in the node b00 and the values of the eight counters of the leaf node v0. The calculated MAC of the leaf node v0 is matched with the stored MAC of the leaf node v0. If the stored MAC of the leaf node v0 does not match the calculated MAC of the leaf node v0, it indicates that the leaf node v0 is tampered with, and the integrity verification of the data 000 fails. If the stored MAC of the leaf node v0 matches the calculated MAC of the leaf node v0, the integrity of the parent node (that is, the node b00) of the leaf node v0 continues to be verified. The rest is deduced by analogy, until the root node b33 is verified. If it is verified that the stored MAC of the root node b33 matches a calculated MAC of the root node b33, it indicates that the data 000 is not tampered with.

It should be noted that FIG. 5A and FIG. 5B show that a tag of a data block and corresponding data are stored in a same cache line. In an embodiment, as shown in FIG. 2, a tag of a data block and corresponding data may be separately stored.

Figure 6:
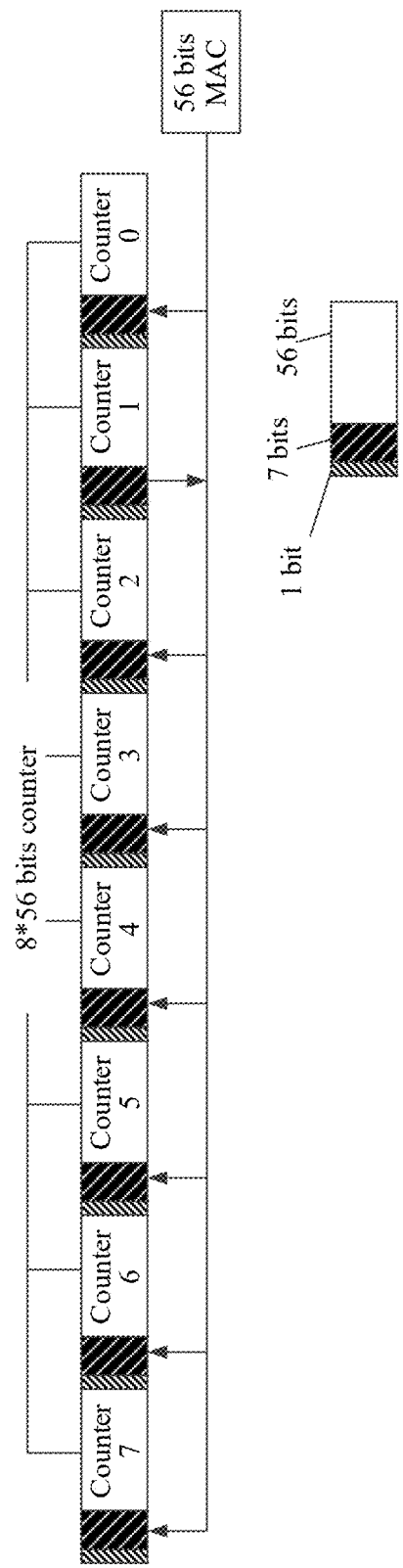
FIG. 6 is a schematic diagram of a data structure of a node in an integrity tree.

For each node in the integrity tree, a MAC of the node and a plurality of counters of the node are stored in a same cache line, to ensure the integrity of the node. As shown in FIG. 5A and FIG. 5B, a MAC of a node is stored together. In an embodiment, as shown in FIG. 6, FIG. 6 is a schematic diagram of a data structure of a node in an integrity tree, a MAC of a node may be separately stored, that is, the MAC of the node may be divided into a plurality of parts for separate storage. For example, the MAC of the node is divided into eight equal parts, and the eight parts are stored together with eight counters of the node in a one-to-one correspondence, where each counter occupies 56 bits. For example, a size of the MAC shown in FIG. 6 is 56 bits. The 56-bit MAC is divided into eight equal parts, and each part is 8 bits, where 7 bits of the 8 bits are used and 1 bit is not used. In an embodiment, the size of the MAC includes but is not limited to 56 bits, and the MAC may not be stored in equal parts during partitioning.

In an embodiment, the MAC function in FIG. 5A and FIG. 5B may be a one-way cryptographic function such as AES-GCM or SHA-256.

It can be learned from the foregoing that one data block corresponds to one counter, and each time data is written into a data block, a counter corresponding to the data block is increased by 1. In actual application, access frequencies of the processor for different data blocks are different. For example, a quantity of times of writing data into a data block 1 is greater than a quantity of times of writing data into a data block 2. In this case, the data block 1 requires a larger storage resource of a counter than the data block 2. For example, the counter corresponding to the data block 1 needs a 30-bit storage resource to record a quantity of times of performing a write operation on the data block 1 and prevent overflow, and the counter corresponding to the data block 2 only needs a 10-bit storage resource to record a quantity of times of performing a write operation on the data block 2. However, in a current integrity tree, storage resources of counters corresponding to different data blocks are the same. For example, in FIG. 5A and FIG. 5B, a storage resource of each counter is 50 bits. As a result, a counter corresponding to a data block with a relatively high access frequency easily overflows, and a storage resource of a counter corresponding to a data block with a relatively low access frequency is wasted, resulting in poor performance of data integrity verification.

To resolve the foregoing technical problem, in embodiments of this application, a shared counter is set. The shared counter includes at least two sub-counters, and the at least two sub-counters share a storage resource of the shared counter. In addition, a size of a shared storage resource of each sub-counter may be dynamically adjusted based on an access status of a data block. For example, a sub-counter 1 occupies, at a first time, 30-bit storage resource of a shared counter to which the sub-counter 1 belongs. When it is detected that an access frequency of the sub-counter 1 at a second time is relatively high, a storage resource of the sub-counter 1 may be adjusted from 30 bits to 40 bits, thereby dynamically adjusting a storage resource of each sub-counter, reducing an overflow probability of a counter corresponding to a data block with a high access frequency, improving utilization of a storage resource of a counter, and improving performance of data integrity verification.

Some embodiments are used below to describe in detail the technical solutions in embodiments of this application. The following several embodiments may be combined with each other, and a same or similar concept or process may not be described repeatedly in some embodiments.

Figure 7:
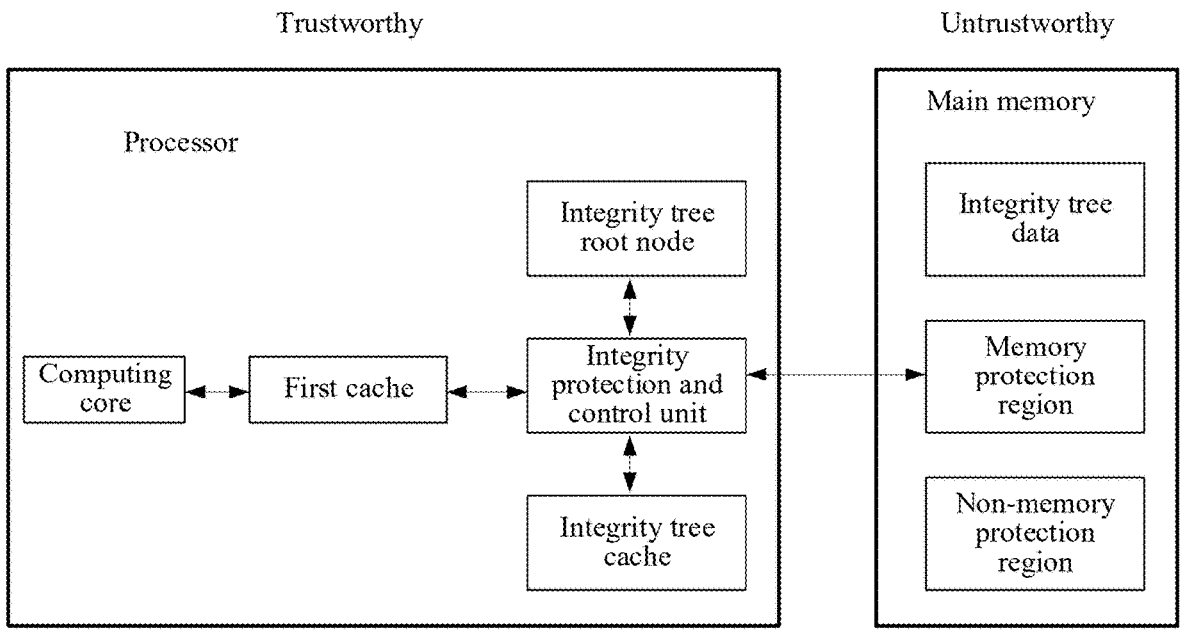
FIG. 7 is a schematic diagram of a computing system with an integrity protection mechanism according to an embodiment of this application.

First, with reference to FIG. 7, a computer system in an embodiment of this application is described in detail.

FIG. 7 is a schematic diagram of a computing system with an integrity protection mechanism according to an embodiment of this application. As shown in FIG. 7, the computer system includes a processor and a DRAM (main memory). The processor is trustworthy, and the DRAM is untrustworthy. In other words, data in the processor cannot be attacked or tampered with by an attacker. Therefore, an edge of the processor may be used as a trust boundary. Data in the DRAM may be arbitrarily attacked or tampered with by an attacker. For example, data in the main memory or data on a physical channel between the main memory and the processor may be intercepted or tampered with. The processor and the main memory are communicatively connected by using a bus, for example, by using a bus. To prevent an attacker from reading data in the DRAM, the data in the DRAM needs to be encrypted, so that the attacker cannot read the data in the DRAM. In addition, to prevent an attacker from performing a replay attack on data in the DRAM to tamper with the data in the DRAM, integrity verification needs to be performed on the data each time the data is read from the DRAM.

As shown in FIG. 7, the processor includes a computing core (for example, a CPU core), a first cache, an integrity tree root node (Merkle tree root), an integrity protection and control unit (Memory Integrity Controller), and an integrity tree cache (Merkle tree cache).

The first cache may include a plurality of levels of caches, for example, include a cache L1, a cache L2, and a cache L3. The first cache is used to cache data, for example, cache data read from a main memory, where the data in the first cache is data on which integrity verification succeeds. In this way, in a process of reading target data, the processor first queries the first cache for the target data. For example, the processor queries the cache L1 for the target data, queries the cache L2 for the target data if the target data is not found in the cache L1, and queries the cache L3 for the target data if the target data is not found in the cache L2. After finding the target data in the first cache, the processor directly returns the found target data. When the processor does not find the target data in the first cache, the processor reads the target data from the main memory, and performs integrity verification on the target data.

The integrity tree root node is the root of the integrity tree. Private data that cannot be tampered with externally is stored in the processor, to prevent the root node from being read or tampered with by an attacker, thereby ensuring reliability and accuracy of data integrity verification.

Integrity tree cache: In a general-purpose system, data of sub-nodes of an integrity tree is usually stored in a main memory, and an access speed is relatively slow. The integrity tree cache can cache data of the integrity tree that is recently accessed, so as to accelerate an access speed and improve performance. In other words, the integrity tree cache caches one or more sub-nodes of the integrity tree that are read during the previous integrity verification. During the current integrity verification, to improve the speed of integrity verification, the processor first queries the integrity tree cache for a required sub-node, for example, a node 1. If the node 1 is found in the integrity tree cache, the node 1 is directly used to perform the integrity verification, without being read from the main memory, thereby improving the speed of integrity verification. In addition, because the processor is trustworthy, and the integrity tree node stored in the integrity tree cache is trustworthy and will not be tampered with by an attacker, integrity verification does not need to be performed on the node cached in the integrity tree cache again, thereby further improving the speed of integrity verification. As shown in FIG. 5A and FIG. 5B, for example, an integrity tree cache caches a leaf node v00, a node b16, and a node b22. The processor reads data 000 in a data block 70 and a MAC 60 corresponding to the data 000 from the main memory, and then performs integrity verification on the data 000. The processor determines, based on a correspondence between a data block and a leaf node, that the data block 70 corresponds to the leaf node v00. Then, the processor queries the integrity tree cache to determine whether the leaf node v00 is cached. If the leaf node v00 is found in the integrity tree cache, the processor calculates, by using a MAC function based on counters C00000 to C00007 of the leaf node v00 and the read data 000, a MAC corresponding to the data 000, and records the MAC as a MAC 6. The processor matches the calculated MAC 6 with a MAC 60 read from the main memory. If the MAC 6 matches the MAC 60, it indicates that the data 000 is not tampered with, the integrity verification succeeds, and integrity verification does not need to be performed on the leaf node v00. If the processor does not find the leaf node v00 in the integrity tree cache, the processor reads the leaf node v00 from the main memory, and determines, based on the foregoing method, whether the calculated MAC 6 matches the MAC 60 read from the main memory. If the MAC 6 matches the MAC 60, the processor reads a parent node of the leaf node v00 from the main memory, to verify integrity of the leaf node v00. The rest is deduced by analogy, until the root node is verified.

For example, in some embodiments, the processor further includes an encryption engine (MEE). The MEE is configured to encrypt plaintext based on a counter, and is further configured to decrypt ciphertext read from the main memory. This can prevent malicious observers from reading data in the main memory. An encryption key used for encryption and decryption may be stored in the processor, for example, stored in a register in the processor. An encryption or decryption method used by the encryption engine is not limited in embodiments of this application.

Still refer to FIG. 7. The DRAM includes a memory protection region, integrity tree (Merkle Tree) data, and a non-memory protection region (Normal Region).

The memory protection region is a memory region on which integrity protection is performed in the main memory. The data block in embodiments of this application is a data block corresponding to the memory protection region.

Non-memory protection region: a memory region without integrity protection in the main memory.

Integrity tree data is data used to protect an integrity tree of the main memory. Generally, the data is stored in the main memory, or may be stored in another storage component, for example, a CPU chip.

In an embodiment, the main memory includes ciphertext data, where password data is data encrypted by the encryption engine. For example, the processor controls the encryption engine to encrypt plaintext data to obtain ciphertext data, and stores the ciphertext data in the main memory. After being read by an attacker, the ciphertext data cannot be decrypted, thereby preventing a malicious observer from reading data in the main memory.

In an embodiment, the main memory further includes plaintext data. The plaintext data is data that is not encrypted, and an attacker may randomly read the plaintext data. In an embodiment, the plaintext data is stored in the non-memory protection region of the main memory.

In a data reading process, the processor first queries, in the first cache, whether target data that is to be read is cached, and if the target data is cached in the first cache, directly reads the target data from the first cache. If the target data is not found in the first cache, the target data is read from the main memory. For example, the ciphertext data of the target data is read from the memory protection region of the main memory, and is decrypted and stored in the first cache.

To verify integrity of the target data, the processor queries the integrity tree cache to determine whether an integrity tree node corresponding to the target data exist. If the integrity tree node exists, the processor uses the integrity tree node to verify the integrity of the target data. If the processor does not find the integrity tree node corresponding to the target data in the integrity tree cache, the processor reads the integrity tree node, for example, a node 1, corresponding to the target data from the integrity tree data of the main memory, and uses the node 1 to calculate a MAC of the target data. If the calculated MAC matches a stored MAC of the target data, integrity of the node 1 continues to be verified. The rest is deduced by analogy, until the corresponding root node is verified.

In a write process of data, the computing core writes the target data into a corresponding data block in the memory protection region, and simultaneously updates a value of a counter and a MAC value that correspond to the data block.

Based on the computer system shown in FIG. 7, a resource allocation method provided in embodiments of this application is described in detail with reference to FIG. 8.

Figure 8:
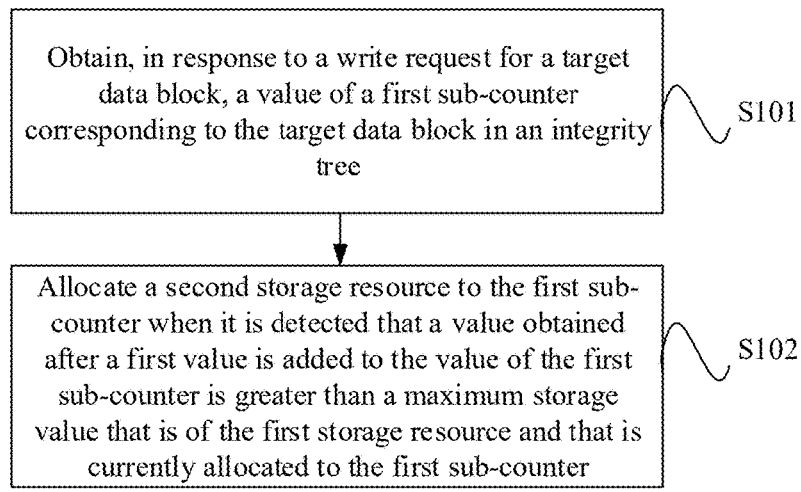
FIG. 8 is a schematic flowchart of a resource allocation method according to an embodiment of this application.

FIG. 8 is a schematic flowchart of a resource allocation method according to an embodiment of this application. As shown in FIG. 8, the method in embodiments of this application includes the following operations.

S101: Obtain, in response to a write request for a target data block, a value of a first sub-counter corresponding to the target data block in an integrity tree.

The first sub-counter is a sub-counter of a first shared counter, and a first storage resource of the first sub-counter belongs to a storage resource of the first shared counter.

Figure 9:
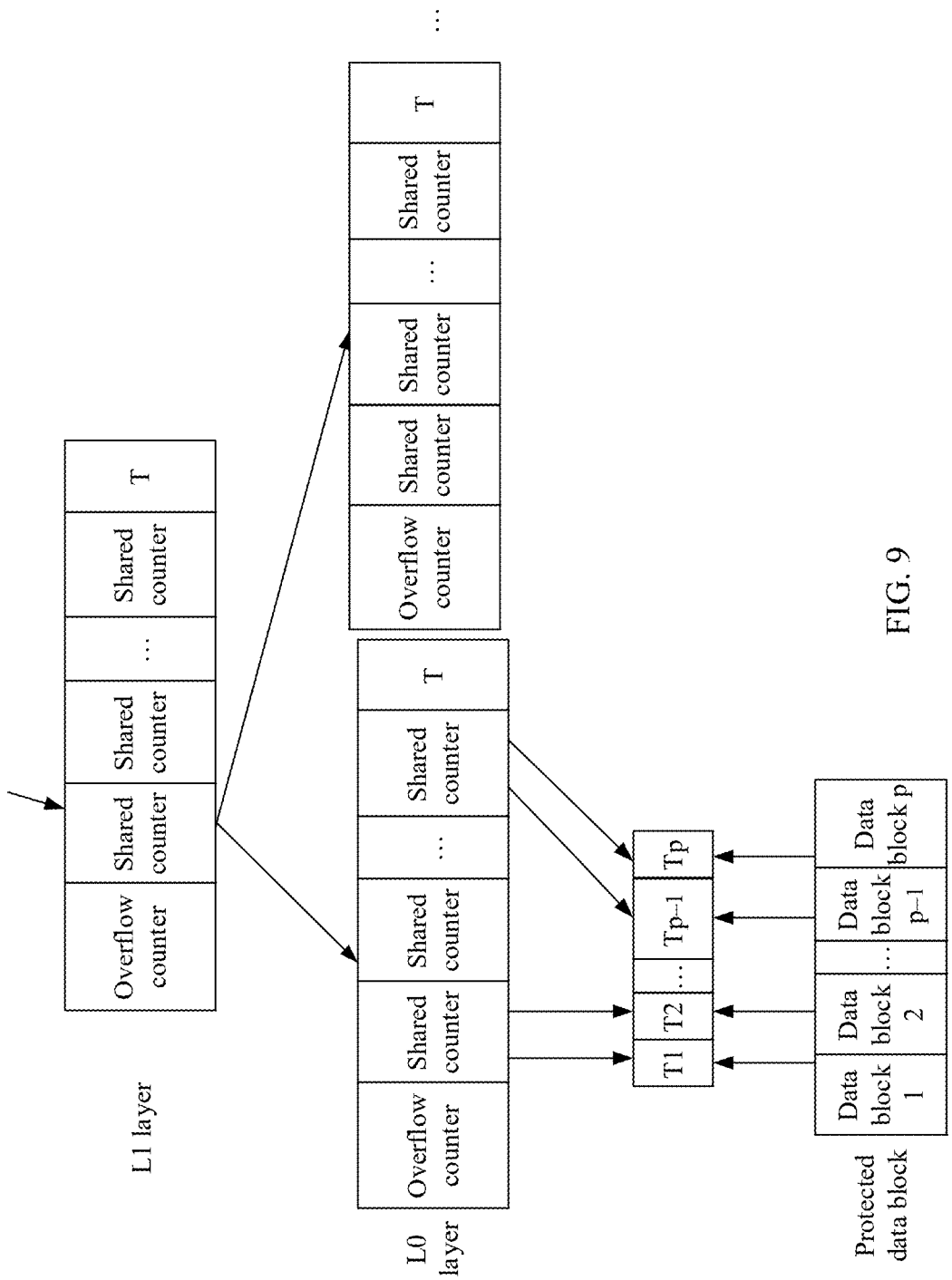
FIG. 9 is a schematic diagram of a structure of an integrity tree according to an embodiment of this application.

FIG. 9 is a schematic diagram of a structure of an integrity tree according to an embodiment of this application. The following describes in detail the integrity tree according to embodiments of this application with reference to FIG. 9.

As shown in FIG. 9, in the integrity tree in embodiments of this application, a conventional integrity tree counter with a fixed width is changed to a counter whose width can be dynamically adjusted. The width herein may be understood as a storage resource of the counter. For example, one shared counter includes two or more sub-counters, and the two or more sub-counters share a storage resource of the shared counter. As shown in FIG. 9, one node includes a plurality of shared counters. For example, the node includes eight shared counters, each shared counter may be shared by a plurality of sub-counters, and partitioning of a storage resource of a shared counter may be dynamically adjusted according to a requirement of sub-counters. Each sub-counter of a leaf node corresponds to one data block.

Figure 10:
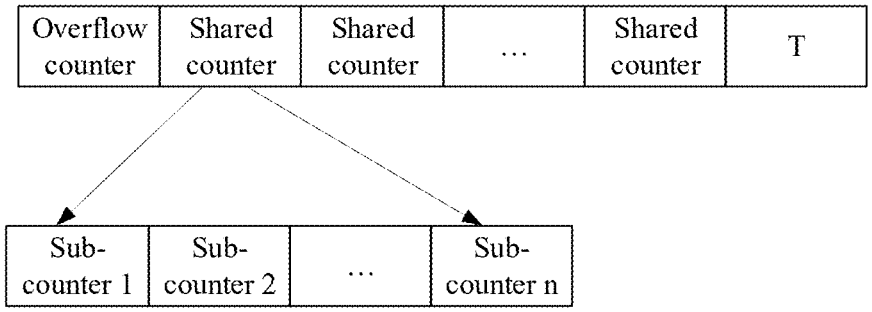
FIG. 10 is a schematic diagram of a structure of a shared counter.

FIG. 10 is a schematic diagram of a structure of a shared counter. As shown in FIG. 10, the shared counter includes n sub-counters, and the n sub-counters share a storage resource of the shared counter. For example, if the storage resource of the shared counter is 50 bits, the n sub-counters share the 50-bit storage resource. It is assumed that n is 2, and the two sub-counters are respectively denoted as a sub-counter 1 and a sub-counter 2. The sub-counter 1 occupies 12 bits in the 50-bit storage resource of the shared counter, and the sub-counter 2 occupies 35 bits in the 50-bit storage resource of the shared counter.

In a write process of data, the processor receives a write request for a target data block, where the write request is used to request to write data into the target data block. After receiving the write request for the target data block, the processor obtains a value of a first sub-counter corresponding to the target data block in the integrity tree. For example, it is assumed that the target data block is a data block 0 in FIG. 9. When receiving a write request for the target data block, the processor obtains a value of a first sub-counter corresponding to the target data block. It is assumed that the obtained value of the first sub-counter is 111111111111.

S102: Allocate a second storage resource to the first sub-counter when it is detected that a value obtained after a first value is added to the value of the first sub-counter is greater than a maximum storage value of the first storage resource.

The second storage resource also belongs to the storage resource of the first shared counter.

For example, it is assumed that the first shared counter includes two sub-counters: a first sub-counter and a second sub-counter, and the first sub-counter and the second sub-counter share a storage resource of the first shared counter. In other words, storage resources of the first sub-counter and the second sub-counter both belong to the storage resource of the first shared counter, and a storage resource of the first sub-counter does not overlap a storage resource of the second sub-counter. As shown in Table 1, there are m allocation manners of the storage resource of the first shared counter, and m is a positive integer greater than or equal to 2.

TABLE 1

| Allocation manner 1 | 12 | 35 |
| Allocation manner 2 | 16 | 31 |
| . . . | . . . | . . . |

Table 1 shows m allocation manner of the storage resource of the first shared counter. For example, in an allocation manner 1, when the first sub-counter occupies a 12-bit storage resource of the first shared counter, the second sub-counter occupies a 35-bit storage resource of the shared counter. In an allocation manner 2, when the first sub-counter occupies a 20-bit storage resource of the first shared counter, the second sub-counter occupies a 27-bit storage resource of the first shared counter.

It can be learned from the foregoing data integrity protection principle of the integrity tree that, when data is written into the target data block, a first value needs to be added to a value of a first sub-counter corresponding to the target data block, to record one write operation performed on the target data block. A MAC value of the target data block is recalculated based on the added value of the first sub-counter, and is denoted as a MAC value 1, and the MAC value 1 is stored. In this way, when data is subsequently read from the target data block, a MAC value is obtained through calculation based on the value of the first sub-counter and the data in the target data block, and is denoted as a MAC value 2. The MAC value 2 is compared with the stored MAC value 1, so as to determine whether the data in the target data block is tampered with.

Based on this, when writing data into the target data block, the processor obtains a value of a first sub-counter corresponding to the target data block, and determines whether a value obtained after a first value is added to the value of the first sub-counter is greater than a maximum storage value of the first storage resource that is currently allocated to the first sub-counter, where the first value is a positive integer. For example, it is assumed that the value of the first sub-counter obtained by the processor is 111111111111, and the first sub-counter occupies a 12-bit storage resource of the first shared counter, that is, a size of the first storage resource is 12 bits. After adding the first value to the value of the first sub-counter, the processor determines that a value obtained after the first value is added to the value of the first sub-counter is greater than a maximum storage value of the first storage resource, that is, 111111111111. In this case, it indicates that the first sub-counter overflows, and the first storage resource currently allocated to the first sub-counter cannot meet an actual requirement of the first sub-counter. In this case, the processor allocates a second storage resource to the first sub-counter. In this case, a storage resource of the first sub-counter is a sum of the first storage resource and the second storage resource. For example, as shown in Table 2, a 4-bit storage resource is further allocated to the first sub-counter, so that the adjusted storage resource of the first sub-counter is 16 bits. In this way, the storage resource of the first sub-counter is increased, thereby further preventing overflow of the first sub-counter and improving performance of data integrity verification of the integrity tree.

It can be learned from the foregoing description that, in embodiments of this application, when it is determined that the first storage resource of the first sub-counter cannot meet a requirement, the second storage resource is allocated to the first sub-counter, so as to dynamically adjust the storage resource of the first shared counter according to a requirement of a storage resource of a sub-counter, thereby improving utilization of the storage resource of the first shared counter.

In an example, the second storage resource may be an idle storage resource that is not allocated in the first shared counter.

In another example, it can be learned from the foregoing description that the first shared counter further includes a second sub-counter, a storage resource of the second sub-counter is denoted as a third storage resource, and the third storage resource also belongs to the storage resource of the first shared counter. In other words, the first sub-counter and the second sub-counter share the storage resource of the first shared counter.

In an embodiment, the second storage resource includes an idle storage resource that is not used in the third storage resource.

In an embodiment, the second storage resource includes an idle storage resource that is not allocated in the first shared counter and an idle storage resource that is not used in the third storage resource.

In an embodiment, when the second storage resource is an idle storage resource that is not used in the third storage resource, an embodiment of this application further includes adjusting the third storage resource, so that a difference between the third storage resource before the adjustment and the third storage resource after the adjustment is equal to the second storage resource.

According to the resource allocation method provided in embodiments of this application, in response to a write request for a target data block, a value of a first sub-counter corresponding to the target data block in an integrity tree is obtained, where the first sub-counter is a sub-counter of a first shared counter, and a first storage resource of the first sub-counter belongs to a storage resource of the first shared counter. A second storage resource is allocated to the first sub-counter when it is detected that a value obtained after a first value is added to the value of the first sub-counter is greater than a maximum storage value of the first storage resource, so as to implement dynamic adjustment of the storage resource of the first shared counter, thereby improving utilization of the storage resource of the first shared counter. In this way, the adjusted storage resource of the first sub-counter is increased, thereby further preventing overflow of the first sub-counter and improving performance of data integrity verification of the integrity tree.

Figure 11:
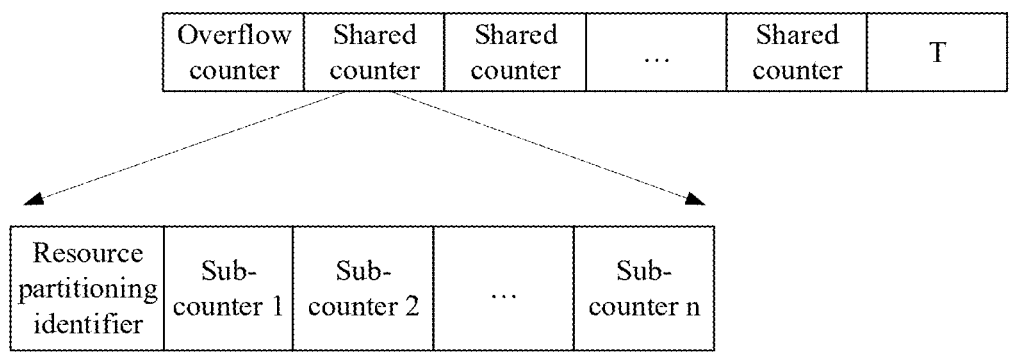
FIG. 11 is another schematic diagram of a structure of a shared counter according to an embodiment of this application.

In some embodiments, as shown in FIG. 11, in addition to the at least two sub-counters, a shared counter further includes a resource partitioning identifier (for example, Metadata), and the resource partitioning identifier indicates a storage resource of a sub-counter. It should be noted that the first shared counter belongs to the shared counter to be described in embodiments of this application. In other words, in addition to the first sub-counter and the second sub-counter, the first shared counter further includes a resource partitioning identifier, and the resource partitioning identifier indicates a storage resource of the first sub-counter and/or the second sub-counter.

There may be different resource partitioning manners. The following describes two resource partitioning manners: continuous resource partitioning and discontinuous resource partitioning.

Manner 1 is the continuous resource partitioning. In this partitioning manner, a resource partitioning granularity is relatively small. For example, a shared counter includes two sub-counters, which are denoted as a sub-counter 1 and a sub-counter 2. A storage resource of the shared counter is 50 bits, and a resource partitioning granularity is 1 bit. In this case, a resource partitioning identifier needs to be represented by 6 bits, and the sub-counter 1 and the sub-counter 2 share 44 bits. Different correspondences between a resource partitioning identifier and each storage resource are shown in Table 2.

TABLE 2

| Resource partitioning identifier | Size of storage resource of sub-counter 1 (bits) | Size of storage resource of sub-counter 2 (bits) |
| --- | --- | --- |
| 000000 | 1 | 43 |
| 000001 | 2 | 42 |
| 000010 | 3 | 41 |
| 000011 | 4 | 40 |
| ... | ... | ... |

It can be learned from Table 2 that, a resource partitioning identifier 000001 indicates that the sub-counter 1 occupies a storage resource of the shared counter as follows: Starting from the 7th bit from the left, the sub-counter 1 occupies a 2-bit storage resource of the shared counter, and the sub-counter 2 occupies the remaining 42-bit storage resource of the shared counter.

It should be noted that Table 2 is merely an example of continuous resource partitioning in embodiments of this application, and a resource partitioning manner of the shared counter in embodiments of this application includes but is not limited to that shown in Table 2.

Manner 2 is discontinuous resource partitioning. In this partitioning manner, the resource partitioning identifier occupies a relatively few storage resource of the shared counter. For example, a shared counter includes two sub-counters, which are denoted as a sub-counter 1 and a sub-counter 2. A storage resource of the shared counter is 50 bits, and there are eight types of preset resource allocation manners. In this case, 3 bits are needed to identify the eight types of resource allocation manners, that is, the resource partitioning identifier needs to be represented by 3 bits, and the sub-counter 1 and the sub-counter 2 share 47 bits. Different correspondences between a resource partitioning identifier and each storage resource are shown in Table 3.

TABLE 3

| Resource partitioning identifier | Size of storage resource of sub-counter 1 (bits) | Size of storage resource of sub-counter 2 (bits) |
|---|---|---|
| 000 | 12 | 35 |
| 001 | 16 | 31 |
| 010 | 20 | 27 |
| 011 | 23 | 24 |
| 100 | 24 | 23 |
| 101 | 27 | 20 |
| 110 | 31 | 16 |
| 111 | 35 | 12 |

It can be learned from Table 3 that, a resource partitioning identifier 101 indicates that the sub-counter 1 occupies a storage resource of the shared counter as follows: Starting from the 4th bit from the left, the sub-counter 1 occupies a 20-bit storage resource of the shared counter, and the sub-counter 2 occupies the remaining 27-bit storage resource of the shared counter.

It should be noted that Table 3 is merely an example of discontinuous resource partitioning in embodiments of this application, and a resource partitioning manner of the shared counter in embodiments of this application includes but is not limited to that shown in Table 3.

In some embodiments, in the foregoing correspondence, differences between sizes of storage resources of a same sub-counter corresponding to two adjacent resource partitioning identifiers are the same. For example, as shown in Table 2, a difference between sizes of storage resources of the sub-counter 1 corresponding to a resource partitioning identifier 000000 and a resource partitioning identifier 000001 that are adjacent is 1 bit, and a difference between sizes of storage resources of the sub-counter 1 corresponding to a resource partitioning identifier 000001 and a resource partitioning identifier 000010 that are adjacent is 1 bit. Similarly, a difference between sizes of storage resources of the sub-counter 2 corresponding to the resource partitioning identifier 000000 and the resource partitioning identifier 000001 that are adjacent is 1 bit, and a difference between sizes of storage resources of the sub-counter 2 corresponding to the resource partitioning identifier 000001 and the resource partitioning identifier 000010 that are adjacent is 1 bit.

In some embodiments, in the foregoing correspondence, differences between sizes of storage resources of a same sub-counter corresponding to two adjacent resource partitioning identifiers are different. For example, as shown in Table 3, a difference between sizes of storage resources of the sub-counter 1 corresponding to a resource partitioning identifier 010 and a resource partitioning identifier 011 that are adjacent is 3 bits, and a difference between sizes of storage resources of the sub-counter 1 corresponding to a resource partitioning identifier 011 and a resource partitioning identifier 100 that are adjacent is 1 bit. Similarly, a difference between sizes of storage resources of the sub-counter 2 corresponding to the resource partitioning identifier 010 and the resource partitioning identifier 011 that are adjacent is 3 bits, and a difference between sizes of storage resources of the sub-counter 2 corresponding to the resource partitioning identifier 011 and the resource partitioning identifier 100 that are adjacent is 1 bit.

The foregoing describes the resource partitioning identifier of the storage resource of the shared counter, and the following describes a data structure of the shared counter. In embodiments of this application, a data structure of the shared counter is related to a quantity of sub-counters included in the shared counter.

Case 1: The shared counter includes two sub-counters and one resource partitioning identifier, where the resource partitioning identifier indicates a storage resource of at least one of the two sub-counters, and a total storage resource that is of the shared counter and that is occupied by the two sub-counters is equal to a remaining storage resource in the storage resource of the shared counter except a storage resource occupied by the resource partitioning identifier.

For example, if the shared counter is a first shared counter, the first shared counter includes a first sub-counter, a second sub-counter, and a resource partitioning identifier, and the resource partitioning identifier indicates a storage resource of the first sub-counter and/or the second sub-counter.

Figure 12:
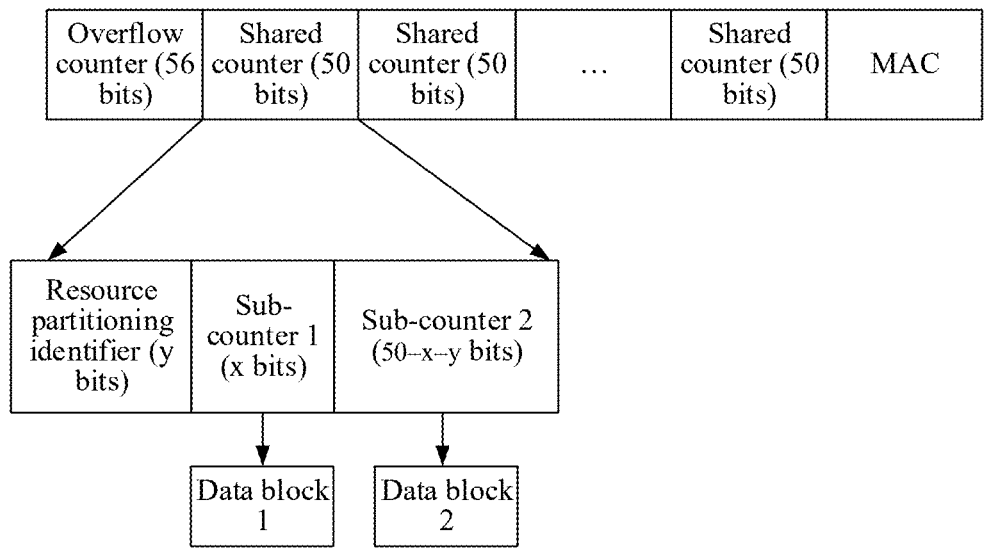
FIG. 12 is still another schematic diagram of a structure of a shared counter according to an embodiment of this application.

For example, as shown in FIG. 12, the shared counter includes one resource partitioning identifier and two sub-counters. The two sub-counters are a sub-counter 1 and a sub-counter 2. The sub-counter 1 corresponds to a data block 1 and is used to maintain data integrity of the data block 1. The sub-counter 2 corresponds to a data block 2 and is used to maintain data integrity of the data block 2. The shared counter has a storage resource with a total of 50 bits. The resource partitioning identifier occupies a y-bit storage resource of the shared counter 1, the sub-counter 1 occupies an x-bit storage resource of the shared counter 1, and the sub-counter 2 occupies a (50−x−y)-bit storage resource of the shared counter 1. It is assumed that y is equal to 3. When a binary value of y is 001 in Table 3, the sub-counter 1 occupies a 16-bit storage resource of the shared counter 1, that is, x is equal to 16, and the sub-counter 2 occupies a remaining 31-bit storage resource of the shared counter. When a binary value of y is 101 in Table 3, the sub-counter 1 occupies a 20-bit storage resource of the shared counter 1, that is, x is equal to 20, and the sub-counter 2 occupies a remaining 27-bit storage resource of the shared counter. In this way, in actual application, the processor may dynamically adjust a storage resource required by a sub-counter by selecting different resource partitioning identifiers, thereby improving utilization of the storage resource, reducing an overflow probability of the sub-counter, and improving performance of data integrity verification.

Case 2: The shared counter includes n sub-counters and n resource partitioning identifiers, where n is a positive integer greater than or equal to 3, the n resource partitioning identifiers are in a one-to-one correspondence with the n sub-counters, and each of the n resource partitioning identifiers indicates a storage resource of a corresponding sub-counter.

For example, the shared counter is a first shared counter. The first shared counter includes a first sub-counter, n−1 second sub-counters, and n resource partitioning identifiers. Each of the n resource partitioning identifiers indicates a storage resource of a corresponding sub-counter.

In case 2, to further improve physical resource utilization, the shared counter includes a plurality of sub-counters, and the plurality of sub-counters share the storage resource of the shared counter.

Figure 13:
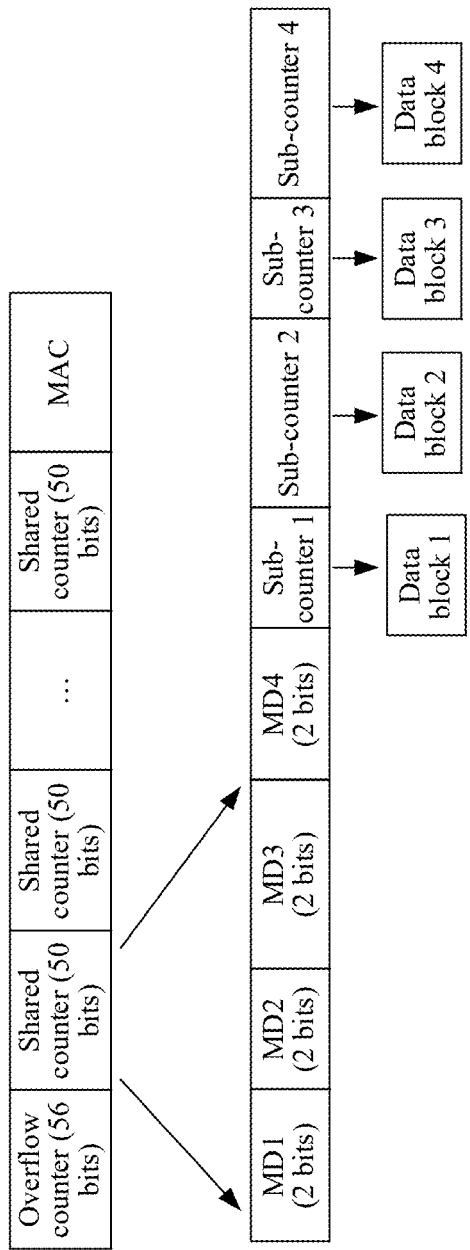
FIG. 13 is another schematic diagram of a structure of a shared counter according to an embodiment of this application.

For example, as shown in FIG. 13, the shared counter includes four resource partitioning identifiers and four sub-counters, where the four resource partitioning identifiers are respectively denoted as MD1, MD2, MD3, and MD4, and the four sub-counters are respectively denoted as a sub-counter 1, a sub-counter 2, a sub-counter 3, and a sub-counter 4. The sub-counter 1 corresponds to a data block 1 and is used to maintain data integrity of the data block 1. The sub-counter 2 corresponds to a data block 2 and is used to maintain data integrity of the data block 2. The sub-counter 3 corresponds to a data block 3 and is used to maintain data integrity of the data block 3. The sub-counter 4 corresponds to a data block 4 and is used to maintain data integrity of the data block 4. It is assumed that the shared counter has a storage resource with a total of 50 bits. The four resource partitioning identifiers respectively occupy a 2-bit storage resource of the shared counter, and the four sub-counters share a remaining 32-bit storage resource of the shared counter.

In case 2, to save the storage resource and reduce that the resource partitioning identifier occupies extremely many storage resources of the shared resource, the storage resource of the share resource is parted in a discontinuous resource partitioning manner. Table 4 shows a resource partitioning manner according to an embodiment of this application. It should be noted that Table 4 is merely an example. A resource partitioning manner in embodiments of this application includes but is not limited to that shown in Table 4.

TABLE 4

| Resource partitioning identifier | Size of resource of sub-counter (bits) |
|---|---|
| 00 | 0 |
| 01 | 8 |
| 10 | 16 |
| 11 | 24 |

It can be learned from Table 4 that, when a value of MD1 is 01, it indicates that starting from the 3rd bit from the left, the sub-counter 1 occupies an 8-bit storage resource of the shared counter.

Figure 14:
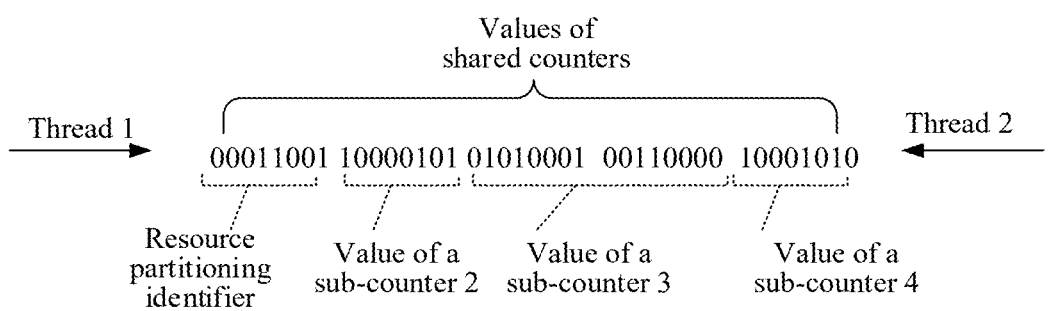
FIG. 14 is a schematic diagram of resource partitioning of a shared counter according to an embodiment of this application.

In a first example, a total storage resource that is of the shared counter and that is occupied by the n sub-counters is equal to a remaining storage resource in the storage resource of the shared counter except the storage resource occupied by the n resource partitioning identifiers. For example, as shown in FIG. 13, it is assumed that the shared counter includes four resource partitioning identifiers and four sub-counters, and a storage resource of the shared counter is 50 bits. Each of the four resource partitioning identifiers occupies a 2-bit storage resource, and the four resource partitioning identifiers occupy an 8-bit storage resource of the shared counter in total. In the storage resource of the shared counter, except the 8-bit storage resource occupied by the four resource partitioning identifiers, a remaining 32-bit storage resource is shared by the four sub-counters. As shown in FIG. 14, it is assumed that values in the shared counter are: 00011001 10000101 01010001 00110000 10001010. A value of each resource partitioning identifier is obtained by parsing the shared counter. With reference to Table 4, it is obtained that a value of MD1 is 00, indicating that the sub-counter 1 occupies a 0-bit storage resource of the shared counter, a value of MD2 is 01, indicating that the sub-counter 2 occupies an 8-bit storage resource of the shared counter, a value of MD3 is 10, indicating that the sub-counter 3 occupies a 16-bit storage resource of the shared counter, and a value of MD4 is 01, indicating that the sub-counter 4 occupies an 8-bit storage resource of the shared counter.

Figure 15:
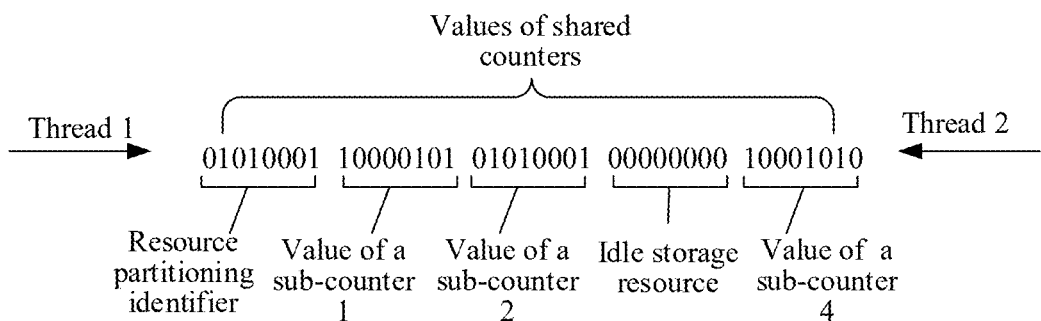
FIG. 15 is a schematic diagram of resource partitioning of a shared counter according to an embodiment of this application.

In a second example, a total storage resource that is of the shared counter and that is occupied by the n sub-counters is less than a remaining storage resource in the storage resource of the shared counter except the storage resource occupied by the n resource partitioning identifiers. Refer to FIG. 13. It is assumed that the shared counter includes four resource partitioning identifiers and four sub-counters, and a storage resource of the shared counter is 50 bits. Each of the four resource partitioning identifiers occupies a 2-bit storage resource, and the four resource partitioning identifiers occupy an 8-bit storage resource of the shared counter in total. In the storage resource of the shared counter, except the 8-bit storage resource occupied by the four resource partitioning identifiers, a remaining 32-bit storage resource is shared by the four sub-counters. As shown in FIG. 15, it is assumed that values in the shared counter are: 01010010 10000101 01010001 00000000 10001010. A value of each resource partitioning identifier is obtained by parsing an 8-bit resource partitioning identifier. With reference to Table 4, it is obtained that a value of MD1 is 01, indicating that the sub-counter 1 occupies an 8-bit storage resource of the shared counter, a value of MD2 is 01, indicating that the sub-counter 2 occupies an 8-bit storage resource of the shared counter, a value of MD3 is 00, indicating that the sub-counter 3 occupies a 0-bit storage resource of the shared counter, and a value of MD4 is 01, indicating that the sub-counter 4 occupies an 8-bit storage resource of the shared counter. The four sub-counters occupy a 24-bit storage resource of the shared counter in total, and the shared counter has an 8-bit idle storage resource.

In some embodiments, to improve a parsing speed of the resource partitioning identifier, the processor may parse the shared counter by using at least two threads, to obtain a value of a sub-counter corresponding to each of the n resource partitioning identifiers. As shown in FIG. 14 and FIG. 15, the processor starts two threads (a thread 1 and a thread 2) to perform parsing from two ends of the shared counter 2. For example, the thread 1 starts parsing from a left end of the shared counter, and the thread 2 starts parsing from a right end of the shared counter, so as to quickly obtain a value of each sub-counter. It should be noted that, before parsing the value of each sub-counter, the thread 1 and the thread 2 need to first parse values of the resource partitioning identifiers. For example, the thread 1 parses the values of the resource partitioning identifiers from the left side of a storage location of the resource partitioning identifiers. The thread 2 starts to parse the values of the resource partitioning identifier from the right side of the storage location of the resource partitioning identifiers.

It should be noted that, in the second example, when the total storage resource that is of the shared counter and that is occupied by the n sub-counters is less than a remaining storage resource in the storage resource of the shared counter except the storage resource occupied by the n resource partitioning identifiers, when the shared counter is parsed from the two ends of the shared counter, an idle resource appears at a junction of two adjacent sub-counters in the middle. For example, in FIG. 15, it is assumed that the sub-counter 1 occupies an 8-bit storage resource of the shared counter, the sub-counter 2 occupies an 8-bit storage resource of the shared counter, the sub-counter 3 occupies a 0-bit storage resource of the shared counter, and the sub-counter 4 occupies an 8-bit storage resource of the shared counter. When two threads are started to parse the four sub-counters respectively from the two ends of the shared counter 2, the thread 1 offsets by 8 bits from the 9th bit from the left end, to obtain a value of the sub-counter 1 as 10000101, offsets by 8 bits to the right from the 17th bit, to obtain a value of the sub-counter 2 as 01010001. The thread 2 offsets by 8 bits to the left from the right end, to obtain a value of the sub-counter 4 as 10001010, and obtain a value of the sub-counter 3 as 0. In this case, there is an 8-bit idle storage resource between the sub-counter 2 and the sub-counter 3.

In some embodiments, in the sub-counters included in the shared counter, a distance between storage addresses, in a storage device, of data blocks corresponding to two adjacent sub-counters is a default value.

Figure 16:
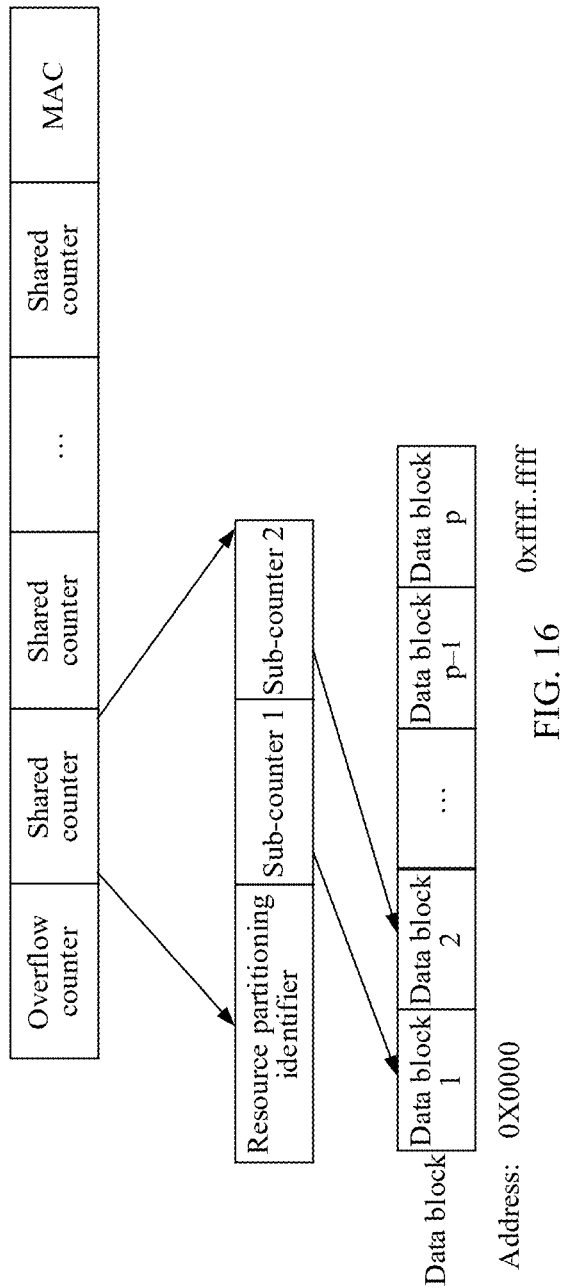
FIG. 16 is another schematic diagram of a structure of an integrity tree according to an embodiment of this application.

In an example, the first shared counter is used as an example. As shown in FIG. 16, it is assumed that the first shared counter includes a sub-counter 1 and a sub-counter 2, where the target data block is a data block 1 in FIG. 16, and the second data block is a data block 2 in FIG. 16. The data block 1 is adjacent to the data block 2, that is, a storage address of the target data block is adjacent to a storage address of the second data block. It should be noted that the storage address of the data block herein refers to a storage address of the data block in a storage device (for example, a memory).

Figure 17:
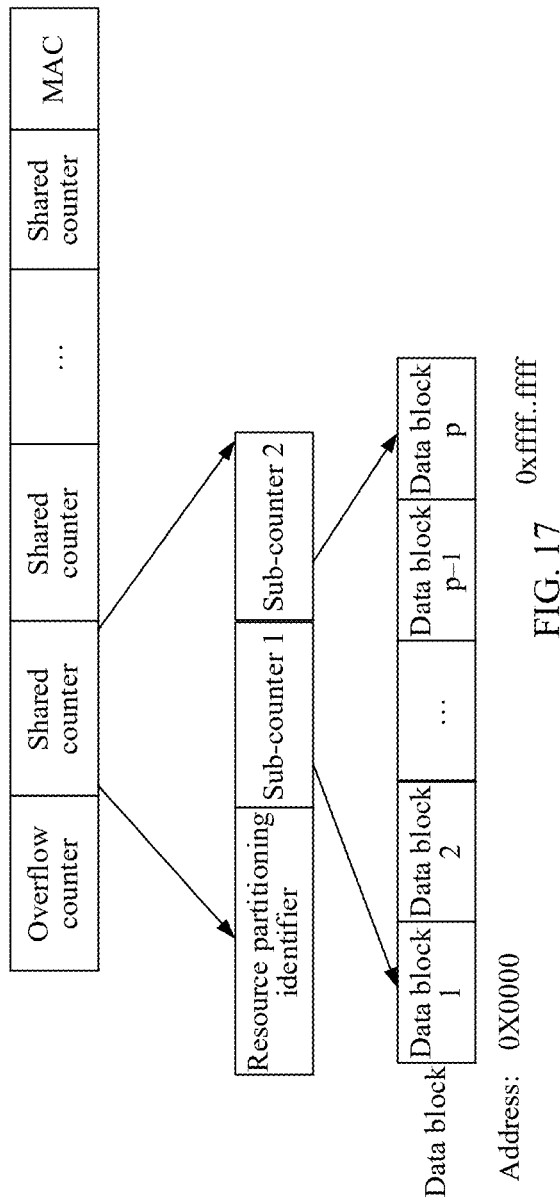
FIG. 17 is another schematic diagram of a structure of an integrity tree according to an embodiment of this application.

In another example, the first shared counter is used as an example. As shown in FIG. 17, it is assumed that the first shared counter includes a sub-counter 1 and a sub-counter 2, the target data block is a data block 1 in FIG. 17, and the second data block is a data block p in FIG. 17. A distance between a storage address of the data block 1 and a storage address of the data block 2 is longest. During actual program running, there is a rule of data access, and a quantity of times of data access between adjacent addresses are usually close. Therefore, requirements for counter resources are usually close. However, data blocks whose addresses with distant addresses are mapped to adjacent sub-counters, and the quantity of times of access of data blocks with distant addresses is less correlated. In this way, utilization of the shared storage resource can be maximized.

In an embodiment, when the shared counter includes the resource partitioning identifier, a data structure of the shared counter is described in detail. Based on this, the resource partitioning method provided in embodiments of this application is further described with reference to FIG. 18.

Figure 18:
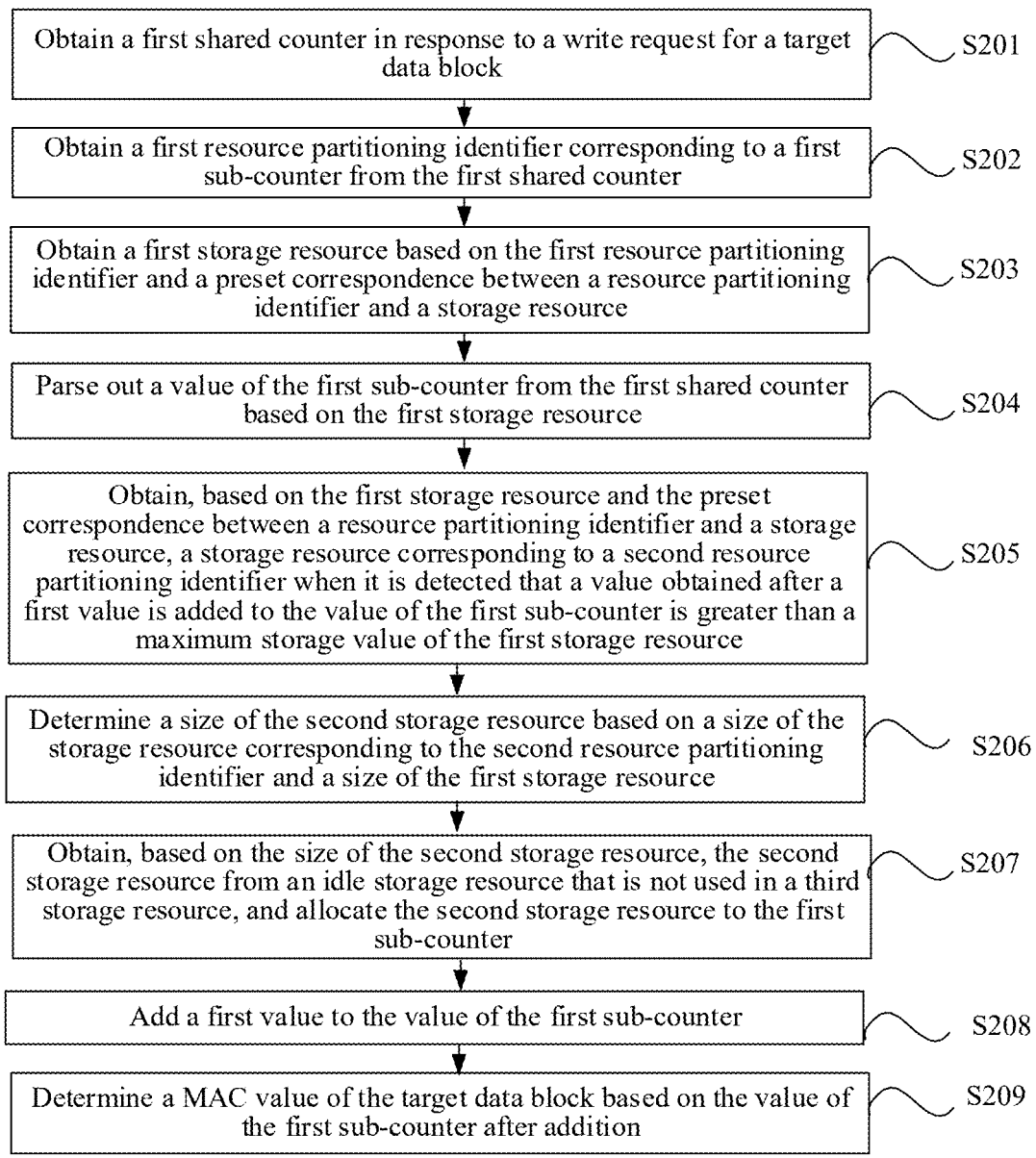
FIG. 18 is another schematic flowchart of a resource partitioning method according to an embodiment of this application.

FIG. 18 is another schematic flowchart of a resource partitioning method according to an embodiment of this application. Based on FIG. 11 to FIG. 17, as shown in FIG. 18, the method in embodiments of this application includes the following operations.

S201: Obtain a first shared counter in response to a write request for a target data block.

For example, a processor receives a write request for a target data block, obtains a first sub-counter corresponding to the target data block, and obtains a first shared counter to which the first sub-counter belongs. For example, as shown in FIG. 12, it is assumed that the target data block is a data block 1. A corresponding first sub-counter is a sub-counter 1, and the sub-counter 1 belongs to a shared counter 1. In other words, the shared counter 1 is denoted as a first shared counter.

S202: Obtain a first resource partitioning identifier corresponding to the first sub-counter from the first shared counter.

For example, the processor parses the first shared counter to obtain a first resource partitioning identifier corresponding to the first sub-counter in the first shared counter. For example, the first resource partitioning identifier corresponding to the first sub-counter obtained through parsing is b001 in Table 3.

S203: Obtain a first storage resource based on the first resource partitioning identifier and a preset correspondence between a resource partitioning identifier and a storage resource.

S204: Parse out a value of the first sub-counter from the first shared counter based on the first storage resource.

It is assumed that the preset correspondence between a resource partitioning identifier and a storage resource is shown in Table 3. In this way, the processor searches the preset correspondence between a resource partitioning identifier and a storage resource for a storage resource corresponding to the first resource partitioning identifier based on the obtained first resource partitioning identifier, denotes the storage resource as the first storage resource, and obtains a value of the first sub-counter corresponding to the first storage resource in the first shared counter. For example, it is assumed that the first shared counter has a 50-bit storage resource, and a value of the storage resource is 001 1111111111111111 00000000000001110000100000100, where the leftmost 3 bits are the storage resource occupied by the first resource partitioning identifier, and the value of the first resource partitioning identifier is 001. In Table 3, it may be found that the first storage resource corresponding to 001 is 16 bits, that is, the first sub-counter occupies a 16-bit storage resource of the first shared counter at a current moment, and the value of the first sub-counter is 1111111111111111.

S205: Obtain, based on the first storage resource and the preset correspondence between a resource partitioning identifier and a storage resource, a storage resource corresponding to a second resource partitioning identifier when it is detected that a value obtained after a first value is added to the value of the first sub-counter is greater than a maximum storage value of the first storage resource.

The storage resource corresponding to the second resource partitioning identifier is greater than the first storage resource.

S206: Determine a size of the second storage resource based on a size of the storage resource corresponding to the second resource partitioning identifier and a size of the first storage resource.

S207: Obtain, based on the size of the second storage resource, the second storage resource from an idle storage resource that is not used in a third storage resource, and allocate the second storage resource to the first sub-counter.

Specifically, after obtaining the value of the first sub-counter according to the foregoing operation, the processor determines whether a value obtained after a first value is added to the value of the first sub-counter is greater than a maximum storage value of the first storage resource. Still refer to the foregoing example. It is assumed that the first storage resource is 16 bits, the maximum storage value of the first storage resource is 1111111111111111, and the value of the first sub-counter at the current moment is also 1111111111111111. Assuming that the first value is 1, the value obtained after the first value is added to the value of the first sub-counter is greater than the maximum storage value of the first storage resource. As a result, the first sub-counter overflows, and one write operation performed on the target data block cannot be recorded. To resolve the technical problem, in embodiments of this application, the storage resource of the first sub-counter is dynamically adjusted, that is, the second storage resource is added based on the first storage resource, so as to increase the storage resource of the first sub-counter, thereby reducing an overflow frequency of the first sub-counter. Then, a storage resource corresponding to a second resource partitioning identifier is obtained based on the first storage resource and the preset correspondence between a resource partitioning identifier and a storage resource, where the storage resource corresponding to the second resource partitioning identifier is greater than the first storage resource. A size of the second storage resource is determined based on a size of the storage resource corresponding to the second resource partitioning identifier and a size of the first storage resource, and the second storage resource is obtained based on the size of the second storage resource from an idle storage resource that is not used in a third storage resource, and is allocated to the first sub-counter.

For example, the processor determines, based on a value of a second sub-counter, whether the first shared counter has an idle resource. For example, the value of the second sub-counter is 0000000000000011100001000000100, and the first 14-bit storage resource is idle. In this way, the processor may determine an adjusted maximum value of the storage resource of the first sub-counter based on the first storage resource of the first sub-counter and the idle storage resource of the first shared counter. For example, the adjusted maximum value of the storage resource of the first sub-counter is 16+14=30 bits. As shown in Table 3, for the storage resource of the first sub-counter, bit values between 16 bits and 30 bits are: 20 bits, 23 bits, 24 bits, and 27 bits. That is, any value of 20 bits, 23 bits, 24 bits, and 27 bits may be selected for the second storage resource. For example, the second resource partitioning identifier b011 is used, and a storage resource corresponding to the second resource partitioning identifier b011 is 23 bits. In other words, it is expected that the adjusted storage resource of the first sub-counter is 23 bits. In this way, it may be determined that a size of the second storage resource is 7 bits. Then, the processor obtains the second storage resource from an idle storage resource that is not used in a third storage resource, and allocates the second storage resource to the first sub-counter. In this way, the processor adjusts the storage resource of the first sub-counter from 16 bits to 23 bits, and correspondingly adjusts the storage resource of the second sub-counter from 31 bits to 24 bits.

In an embodiment, the first resource partitioning identifier and the second resource partitioning identifier are two adjacent resource partitioning identifiers in the correspondence. Still refer to Table 3. If the first resource partitioning identifier is b001, the second resource partitioning identifier is b010.

Then, the first resource partitioning identifier in the first shared counter is replaced with the second resource partitioning identifier.

For example, the processor allocates the second storage resource to the first sub-counter, and simultaneously, the processor replaces the first resource partitioning identifier in the first shared counter with the second resource partitioning identifier. In this way, when subsequently reading data from the target data block, the processor may obtain the second resource partitioning identifier from the first shared counter, accurately determine the storage resource of the first sub-counter based on the second resource partitioning identifier, and accurately read the value of the first sub-counter from the first shared counter for data integrity verification. Refer to the foregoing example. It is assumed that the adjusted first storage resource is 23 bits, and the corresponding second resource partitioning identifier is b011. The first resource partitioning identifier b001 in the first shared counter is replaced with the second resource partitioning identifier b011, and a value of the first shared counter after replacement is 011 00000001111111111111111 000000011100001000000100, where the first sub-counter occupies a 23-bit storage resource of the first shared counter, the value of the first sub-counter is 00000001111111111111111, the second sub-counter occupies a 24-bit storage resource of the first shared counter, and the value of the second sub-counter is 000000011100001000000100.

S208: Add a first value to the value of the first sub-counter.

In embodiments of this application, the processor allocates the second storage resource to the first sub-counter according to the foregoing operations, so that the storage resource of the first sub-counter is increased. In this way, when the first value is added to the value of the first sub-counter, the first sub-counter does not overflow, so that the first sub-counter can accurately record one write operation performed by the processor on the target data block.

S209: Determine a MAC value of the target data block based on the value of the first sub-counter after addition.

After the processor adds the first value to the value of the first sub-counter, the value of the first sub-counter corresponding to the target data block changes. In this case, the MAC value of the target data block needs to be recalculated by using a MAC calculation function based on the updated value of the first sub-counter and the data in the target data block.

In addition, because the value of the first sub-counter changes, the value of the first shared counter changes. Therefore, a MAC value of the first shared counter needs to be recalculated. For a process of calculating the MAC value of the first shared counter, refer to the foregoing descriptions in FIG. 3 to FIG. 5B. Details are not described herein again.

According to the resource partitioning method in embodiments of this application, when the first shared counter includes a resource partitioning identifier, the processor obtains the first shared counter in the integrity tree in response to a write request for a target data block, obtains a first resource partitioning identifier corresponding to a first sub-counter from the first shared counter, and obtains a value of the first sub-counter in the first shared counter based on the first resource partitioning identifier and a preset correspondence between a resource partitioning identifier and a storage resource. Then, the processor obtains, based on a first storage resource and the preset correspondence between a resource partitioning identifier and a storage resource, a storage resource corresponding to a second resource partitioning identifier when it is detected that a value obtained after a first value is added to the value of the first sub-counter is greater than a maximum storage value of the first storage resource, where the storage resource corresponding to the second resource partitioning identifier is greater than the first storage resource; determines a size of the second storage resource based on a size of the storage resource corresponding to the second resource partitioning identifier and a size of the first storage resource; obtains, based on the size of the second storage resource, the second storage resource from an idle storage resource that is not used in the third storage resource, and allocates the second storage resource to the first sub-counter; and adds the first value to the value of the first sub-counter, and determines a MAC value of the target data block based on the value of the first sub-counter after addition. In this way, the storage resource of the first sub-counter is adjusted from the storage resource corresponding to the first resource partitioning identifier to the storage resource corresponding to the second resource partitioning identifier, thereby increasing the storage resource of the first sub-counter, reducing an overflow probability of the first sub-counter, and improving resource utilization of the first shared counter.

In an embodiments of the application, when the second storage resource belongs to the third storage resource, before the second storage resource is allocated to the first sub-counter, whether an unused idle storage resource exists in the third storage resource needs to be first determined. If there is an unused idle storage resource, the second storage resource in the unused idle storage resource in the third storage resource is allocated to the first sub-counter.

When it is detected that there is no unused idle storage resource in the third storage resource, a second value is added to a value of an overflow counter of a first node in which the first shared counter is located, and both the values of the first sub-counter and the second sub-counter are set to a third value, where the second value is a positive integer, and the third value is a positive number.

For example, it is assumed that a value of the first shared counter is 001 1111111111111111 10000000000000111000010000001 00, where a value of the first sub-counter is 1111111111111111, and a maximum storage value of the first storage resource is 1111111111111111. In this case, a value obtained after the first value is added to the value of the first sub-counter is greater than the maximum storage value that is of the first storage resource and that is currently allocated to the first sub-counter, and a value of the second sub-counter is 10000000000000111000010000001 00. Therefore, it is determined that an idle storage resource that is not used in the third storage resource is allocated to the first sub-counter. In this case, a second value is added to a value of an overflow counter of a first node in which the first shared counter is located, for example, the second value is 1, and values of all sub-counters of the first shared counter are all set to a third value, that is, values of both the first sub-counter and the second sub-counter are set to the third value. Assuming that the third value is 0, a reset value of the first shared counter is 001 0000000000000000 0000000000000000000000000000000.

In some embodiments, in addition to setting the values of the first sub-counter and the second sub-counter in the first shared counter to the third value (for example, 0), a value of the resource partitioning identifier in the first shared counter may also be set to the third value (for example, 0), and a resource partitioning manner is re-determined, for example, re-determined to be a resource partitioning manner corresponding to the resource partitioning identifier 010 in Table 3, that is, the first sub-counter occupies a 20-bit storage resource of the first shared counter, and the second sub-counter occupies a 27-bit storage resource of the first shared counter.

In some embodiments, in addition to setting the values of the sub-counters of the first shared counter in the first node to the third value (for example, 0), values of counters other than the first shared counter and the overflow counter in the first node may also be set to the third value (for example, 0).

After the foregoing resetting, a value of at least one counter in the first node changes. For example, the value of the overflow counter and the value of the first shared counter in the first node change. In this case, a MAC value of the first node needs to be re-determined based on a reset value of each counter in the first node. For example, the MAC value of the first node is obtained through corresponding running based on the reset value of each counter in the first node and a value of a counter corresponding to the first node in a parent node.

In addition, it can be learned from the foregoing description that one sub-counter corresponds to one data block, and when a value of the sub-counter changes, a MAC value corresponding to the data block also changes. Therefore, in embodiments of this application, after the sub-counter is reset, a MAC value of the data block corresponding to the sub-counter needs to be re-determined based on a reset value of the sub-counter. For example, the MAC value of the data block is re-determined through corresponding running based on the reset value of the sub-counter and data in the data block.

Figure 19:
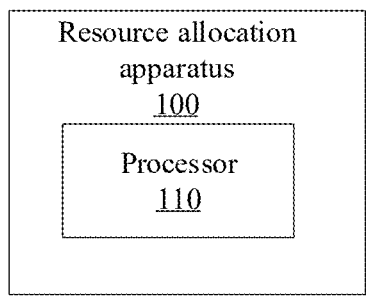
FIG. 19 is a schematic diagram of a structure of a resource allocation apparatus according to an embodiment of this application.

FIG. 19 is a schematic diagram of a structure of a resource allocation apparatus according to an embodiment of this application. The resource allocation apparatus 100 includes a processor 110.

The processor 110 is configured to: obtain, in response to a write request for a target data block, a value of a first sub-counter corresponding to the target data block in an integrity tree, where the first sub-counter is a sub-counter of a first shared counter, a first storage resource of the first sub-counter belongs to a storage resource of the first shared counter, and the first shared counter is a shared counter of a leaf node corresponding to the target data block in the integrity tree; and allocate a second storage resource to the first sub-counter when it is detected that a value obtained after a first value is added to the value of the first sub-counter is greater than a maximum storage value of the first storage resource, where the second storage resource belongs to the storage resource of the first shared counter, and the first value is a positive integer.

In some embodiments, the first shared counter further includes a second sub-counter, a third storage resource of the second sub-counter belongs to the storage resource of the first shared counter, and the second storage resource includes an idle storage resource that is not used in the third storage resource.

In some embodiments, the first shared counter further includes a resource partitioning identifier, and the resource partitioning identifier indicates a storage resource of the first sub-counter.

In some embodiments, the processor 110 is configured to: obtain the first shared counter in response to the write request for the target data block; obtain a first resource partitioning identifier from the first shared counter; obtain the first storage resource based on the first resource partitioning identifier and a preset correspondence between a resource partitioning identifier and a storage resource; and parse out the value of the first sub-counter from the first shared counter based on the first storage resource.

In some embodiments, the processor 110 is configured to: obtain, based on the first storage resource and the preset correspondence between a resource partitioning identifier and a storage resource, a storage resource corresponding to a second resource partitioning identifier, where the storage resource corresponding to the second resource partitioning identifier is greater than the first storage resource; determine a size of the second storage resource based on a size of the storage resource corresponding to the second resource partitioning identifier and a size of the first storage resource; and obtain, based on the size of the second storage resource, the second storage resource from the idle storage resource that is not used in the third storage resource, and allocate the obtained second storage resource to the first sub-counter.

In some embodiments, the processor 110 is further configured to: add the first value to the value of the first sub-counter when the second storage resource is allocated to the first sub-counter; and determine a message authentication code MAC value of the target data block based on the value of the first sub-counter after addition.

In some embodiments, the processor 110 is further configured to: when it is detected that there is an unused idle storage resource in the storage resource of the second sub-counter, allocate the second storage resource in the unused idle storage resource to the first sub-counter.

In some embodiments, the processor 110 is further configured to: when it is detected that there is no unused idle storage resource in the storage resource of the second sub-counter and there is no idle storage resource that is not allocated in the first shared counter, add a second value to a value of an overflow counter of a first node in which the first shared counter is located, and set values of both the first sub-counter and the second sub-counter to a third value, where the second value is a positive integer, and the third value is a positive number.

In some embodiments, values of all counters other than the overflow counter in the first node are set to the third value when the values of the first counter and the second sub-counter are set to the third value.

In some embodiments, a distance between storage addresses, in a storage device, of data blocks corresponding to two adjacent sub-counters in the first shared counter is a default value.

The resource allocation apparatus in embodiments of this application may be configured to perform the technical solutions of the foregoing methods. Implementation principles and technical effects of the resource allocation apparatus are similar, and details are not described herein again.

All or some of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on a computer, the procedure or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more available media. The available medium may be a magnetic medium (for example, a floppy disk, a hard disk, or a magnetic tape), an optical medium (for example, a DVD), a semiconductor medium (for example, a solid-state disk (SSD)), or the like.

It may be clearly understood by one of ordinary skilled in the art that, for the purpose of convenient and brief description, for a detailed working process of the foregoing system, apparatus, and unit, refer to a corresponding process in the foregoing method embodiments. Details are not described herein again. In addition, mutual reference may also be made between the method embodiments and between the apparatus embodiments, and same or corresponding content in different embodiments may be cross-referenced. Details are not described again.

What is claimed is:

1. A resource allocation method, comprising:
    obtaining, in response to a write request for a target data block, a value of a first sub-counter corresponding to the target data block in an integrity tree, wherein the first sub-counter is a sub-counter of a first shared counter, and wherein a first storage resource of the first sub-counter belongs to a storage resource of the first shared counter which is a shared counter of a leaf node corresponding to the target data block in the integrity tree; and
    allocating a second storage resource to the first sub-counter when it is detected that a value obtained after a first value is added to the value of the first sub-counter is greater than a maximum storage value of the first storage resource, wherein the second storage resource belongs to the storage resource of the first shared counter, and the first value is a positive integer.

2. The method according to claim 1, wherein the first shared counter further comprises a second sub-counter, wherein a third storage resource of the second sub-counter belongs to the storage resource of the first shared counter, and wherein the second storage resource comprises an idle storage resource not used in the third storage resource.

3. The method according to claim 2, wherein the first shared counter further comprises a resource partitioning identifier, and wherein the resource partitioning identifier indicates a storage resource of the first sub-counter and/or the second sub-counter.

4. The method according to claim 3, wherein the obtaining the value of the first sub-counter corresponding to the target data block in the integrity tree comprises:
    obtaining the first shared counter in response to the write request for the target data block;
    obtaining a first resource partitioning identifier from the first shared counter;
    obtaining the first storage resource based on the first resource partitioning identifier and a preset correspondence between a resource partitioning identifier and a storage resource; and
    parsing out the value of the first sub-counter from the first shared counter based on the first storage resource.

5. The method according to claim 4, wherein the allocating the second storage resource to the first sub-counter comprises:
    obtaining, based on the first storage resource and the preset correspondence between a resource partitioning identifier and a storage resource, a storage resource corresponding to a second resource partitioning identifier, wherein the storage resource corresponding to the second resource partitioning identifier is greater than the first storage resource;

determining a size of the second storage resource based on a size of the storage resource corresponding to the second resource partitioning identifier and a size of the first storage resource; and obtaining, based on the size of the second storage resource, the second storage resource from the idle storage resource not used in the third storage resource, and allocating the second storage resource to the first sub-counter.

6. The method according to claim 5, further comprising:
adding the first value to the value of the first sub-counter when the second storage resource is allocated to the first sub-counter; and determining a message authentication code (MAC) value of the target data block based on the value of the first sub-counter after addition.

7. The method according to claim 2 wherein the allocating the second storage resource to the first sub-counter comprises:

when an unused idle storage resource in the third storage resource is detected, allocating the second storage resource in the unused idle storage resource to the first sub-counter.

8. The method according to claim 7, further comprising:
when no unused idle storage resource in the third storage resource is detected, adding a second value to a value of an overflow counter of a first node in which the first shared counter is located, and setting values of both the first sub-counter and the second sub-counter to a third value, wherein the second value is a positive integer, and the third value is a positive number.

9. The method according to claim 8, further comprising:
setting values of all counters other than the overflow counter in the first node to the third value when the values of the first sub-counter and the second sub-counter are set to the third value.

10. The method according to claim 2, wherein a distance between storage addresses, in a storage device, of data blocks corresponding to two adjacent sub-counters in the first shared counter is a default value.

11. A resource allocation apparatus, comprising:
a processor configured to:
obtain, in response to a write request for a target data block, a value of a first sub-counter corresponding to the target data block in an integrity tree, wherein the first sub-counter is a sub-counter of a first shared counter, and wherein a first storage resource of the first sub-counter belongs to a storage resource of the first shared counter which is a shared counter of a leaf node corresponding to the target data block in the integrity tree; and allocate a second storage resource to the first sub-counter when it is detected that a value obtained after a first value is added to the value of the first sub-counter is greater than a maximum storage value of the first storage resource, wherein the second storage resource belongs to the storage resource of the first shared counter, and the first value is a positive integer.

12. The apparatus according to claim 11, wherein the first shared counter further comprises a second sub-counter, wherein a third storage resource of the second sub-counter belongs to the storage resource of the first shared counter, and wherein the second storage resource comprises an idle storage resource not used in the third storage resource.

13. The apparatus according to claim 12, wherein the first shared counter further comprises a resource partitioning identifier, and wherein the resource partitioning identifier indicates a storage resource of the first sub-counter.

14. The apparatus according to claim 13, wherein the processor is configured to:
obtain the first shared counter in response to the write request for the target data block;
obtain a first resource partitioning identifier from the first shared counter;
obtain the first storage resource based on the first resource partitioning identifier and a preset correspondence between a resource partitioning identifier and a storage resource; and parse out the value of the first sub-counter from the first shared counter based on the first storage resource.

15. The apparatus according to claim 14, wherein the processor is configured to:
obtain, based on the first storage resource and the preset correspondence between a resource partitioning identifier and a storage resource, a storage resource corresponding to a second resource partitioning identifier, wherein the storage resource corresponding to the second resource partitioning identifier is greater than the first storage resource;
determine a size of the second storage resource based on a size of the storage resource corresponding to the second resource partitioning identifier and a size of the first storage resource; and
obtain, based on the size of the second storage resource, the second storage resource from the idle storage resource not used in the third storage resource, and allocate the obtained second storage resource to the first sub-counter.

16. The apparatus according to claim 15, wherein the processor is further configured to:
add the first value to the value of the first sub-counter when the second storage resource is allocated to the first sub-counter; and
determine a message authentication code MAC value of the target data block based on the value of the first sub-counter after addition.

17. The apparatus according to claim 12, wherein the processor is further configured to:
when there is an unused idle storage resource in the third storage resource of the second sub-counter is detected, allocate the second storage resource in the unused idle storage resource to the first sub-counter.

18. The apparatus according to claim 17, wherein the processor is further configured to:
when there is no unused idle storage resource in the storage resource of the second sub-counter and there is no idle storage resource not allocated in the first shared counter detected, add a second value to a value of an overflow counter of a first node in which the first shared counter is located, and set values of both the first sub-counter and the second sub-counter to a third value, wherein the second value is a positive integer, and the third value is a positive number.

19. The apparatus according to claim 18, wherein values of all counters other than the overflow counter in the first node are set to the third value when the values of the first sub-counter and the second sub-counter are set to the third value.

20. A non-transitory machine-readable storage medium having instructions stored therein, which when executed by a processor, cause the processor to perform operations, the operations comprising:
  obtaining, in response to a write request for a target data block, a value of a first sub-counter corresponding to the target data block in an integrity tree, wherein the first sub-counter is a sub-counter of a first shared counter, and wherein a first storage resource of the first sub-counter belongs to a storage resource of the first shared counter which is a shared counter of a leaf node corresponding to the target data block in the integrity tree; and
  allocating a second storage resource to the first sub-counter when it is detected that a value obtained after a first value is added to the value of the first sub-counter is greater than a maximum storage value of the first storage resource, wherein the second storage resource belongs to the storage resource of the first shared counter, and the first value is a positive integer.

* * * * *